(12) United States Patent  
Xu et al.

(10) Patent No.: US 12,469,200 B2  
(45) Date of Patent: Nov. 11, 2025

(54) METHOD, APPARATUS AND DEVICE FOR PROCESSING SHADOW TEXTURE, COMPUTER-READABLE STORAGE MEDIUM, AND PROGRAM PRODUCT

(71) Applicant: Tencent Technology (Shenzhen) Company Limited, Guangdong (CN)

(72) Inventors: Huabing Xu, Shenzhen (CN); Shun Cao, Shenzhen (CN); Yuanheng Li, Shenzhen (CN); Nan Wei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 514 days.

(21) Appl. No.: 17/963,705

(22) Filed: Oct. 11, 2022

(65) Prior Publication Data

US 2023/0033319 A1   Feb. 2, 2023

Related U.S. Application Data

(63) Continuation of application No. PCT/CN2022/073534, filed on Jan. 24, 2022.

(30) Foreign Application Priority Data

Jan. 26, 2021   (CN) .......................... 202110104608.9

(51) Int. Cl.
*G06T 15/00*   (2011.01)
*G06T 15/04*   (2011.01)
(Continued)

(52) U.S. Cl.
CPC ............ *G06T 15/005* (2013.01); *G06T 15/04* (2013.01); *G06T 15/50* (2013.01); *G06T 15/60* (2013.01);
(Continued)

(58) Field of Classification Search
None
See application file for complete search history.

(56) References Cited

U.S. PATENT DOCUMENTS 7,382,377 B1 *   6/2008   Everitt .................... G06T 15/04  
                                                              345/428  
2017/0221177 A1 *   8/2017   Worcester ............... G06T 11/40  
(Continued)

FOREIGN PATENT DOCUMENTS

CN   110832442 A   2/2020  
CN   111292405 A   6/2020  
(Continued)

OTHER PUBLICATIONS

International Search Report and Written Opinion for priority application No. PCT/CN2022/073534 dated Apr. 6, 2022, with English translation of the International Search Report, 14p.

*Primary Examiner* — Sarah Le  
(74) *Attorney, Agent, or Firm* — Crowell & Moring LLP

(57) ABSTRACT

A method for processing a shadow texture can compute data concurrently to improve computation density, reduce data transmission batches, and improve shadow texture processing efficiency. Model data and light source information of at least one object in a virtual scene is acquired. A shadow with a first resolution corresponding to each object is acquired. A second resolution is determined based on the model data of each object. A shadow edge formed by each object under the influence of the light source information is determined in parallel by utilizing rasterized pixels of the model data. The distance from the rasterized pixels to the shadow edge corresponding to each object is computed, and the corresponding distance data is stored.

20 Claims, 10 Drawing Sheets

(51) Int. Cl.
    *G06T 15/50*         (2011.01)
    *G06T 15/60*         (2006.01)

(52) U.S. Cl.
    CPC ...... *G06T 2210/36* (2013.01); *G06T 2210/52* (2013.01); *G06T 2215/12* (2013.01)

(56) References Cited

U.S. PATENT DOCUMENTS

| | | |
|---|---|---|
| 2018/0357747 A1 | 12/2018 | Young et al. |
| 2019/0272622 A1 | 9/2019 | Voroshilov et al. |
| 2022/0207820 A1 | 6/2022 | Cao et al. |
| 2022/0207821 A1 | 6/2022 | Xu et al. |

FOREIGN PATENT DOCUMENTS

| | | |
|---|---|---|
| CN | 111311723 A | 6/2020 |
| CN | 112734900 A | 4/2021 |
| WO | WO 2022/161319 A1 | 8/2022 |

\* cited by examiner

Smooth line 14-1

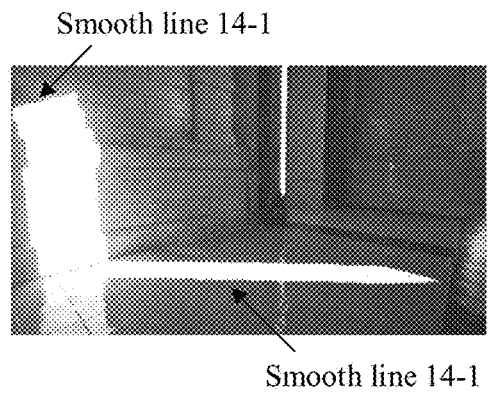

Smooth line 14-1

FIG. 14

```
XXXXXX number of start-up: 14,456 times, Stages Duration: 2,337.319 s, Category
Duration: 2,337.692 s
Stage: XXXXX xxx XXXXX[XXX: X3XX, XX: X.XX ]XXXXX: XXXXX
Stage: XXXXX xxx XXXXX[XXX: X3XX, XX: X.XX ]XXXXX: XXXXX
……
**************
```

FIG. 15

```
*************Code Debug***********
XXXXXX number of start-up: 186 times, Stages Duration: 107.972 s, Category Duration:
108.025 s
Stage: XXXXX xxx XXXXX[XXX: X3XX, XX: X.XX ]XXXXX: XXXXX
Stage: XXXXX xxx XXXXX[XXX: X3XX, XX: X.XX ]XXXXX: XXXXX
...
**************
```

FIG. 16

METHOD, APPARATUS AND DEVICE FOR PROCESSING SHADOW TEXTURE, COMPUTER-READABLE STORAGE MEDIUM, AND PROGRAM PRODUCT

RELATED APPLICATION

This application claims priority as a continuation to PCT/CN2022/073534, filed on Jan. 24, 2022, published as WO2022161319A1, and entitled "SHADOW MAPPING PROCESSING METHOD AND APPARATUS, AND DEVICE, COMPUTER-READABLE STORAGE MEDIUM AND PROGRAM PRODUCT" which claims priority to Chinese Patent Application No. 202110104608.9, filed on Jan. 26, 2021, each of which are incorporated herein by reference in their entirety.

FIELD OF THE TECHNOLOGY

This application relates to a graphic processing technology, and particularly relates to a method, an apparatus and a device for processing a shadow texture, a non-transitory computer-readable storage medium and a program product.

BACKGROUND OF THE DISCLOSURE

Shadow effects can greatly improve the level of images in a virtual scene and enhance the reality sense of the virtual scene. Shadow effects are realized by performing shadow rendering on the corresponding virtual scenes. Shadows are often processed on a texture in advance, that is, a distance field shadow texture is determined for the virtual scene, and the distance field shadow texture is directly utilized for rendering subsequently. However, the computation of the distance field shadow texture mode often takes a long time and the shadow texture processing efficiency is low.

SUMMARY

An embodiment of this application provides a method, an apparatus and a device for processing a shadow texture, a non-transitory computer-readable storage medium, and a program product, aiming at providing the shadow texture baking efficiency.

An embodiment of this application provides a method for processing a shadow texture. The method is performed by an electronic device and includes:

acquiring model data and light source information of at least one object in a virtual scene, and acquiring a shadow texture with a first resolution corresponding to each object;

determining a corresponding second resolution according to the model data of each object, the second resolution representing the resolution in expanding of the model data according to the surface area, and the second resolution being higher than the first resolution;

determining a shadow edge formed by each object under the influence of the light source information in parallel by utilizing rasterized pixels of the model data under the second resolution;

computing the distance from the rasterized pixels to the shadow edge corresponding to each object in parallel to obtain distance data corresponding to each object of the shadow texture with the first resolution; and correspondingly storing the distance data corresponding to each object to the shadow texture with the first resolution so as to obtain a distance field shadow texture corresponding to each object.

An embodiment of this application provides an apparatus for processing a shadow texture. The apparatus is configured to:

acquire model data and light source information of at least one object in the virtual scene, and acquiring the shadow texture with the first resolution corresponding to each object;

determine the corresponding second resolution according to the model data of each object, the second resolution representing the resolution in expanding of the model data according to the surface area, and the second resolution being higher than the first resolution;

determine the shadow edge formed by each object under the influence of the light source information in parallel by utilizing rasterized pixels of the model data under the second resolution, and computing the distance from the rasterized pixels to the shadow edge corresponding to each object in parallel to obtain distance data corresponding to each object of the shadow texture with the first resolution; and store the distance data corresponding to each object to the shadow texture with the first resolution so as to obtain the distance field shadow texture corresponding to each object.

An embodiment of this application provides an electronic device for processing a shadow texture. The electronic device includes:

a memory, configured to store executable instructions; and a processor, configured to implement, when executing the executable instructions stored in the memory, the method for processing a shadow texture according to the embodiment of this application.

The embodiment of this application provides a non-transitory computer readable storage medium which stores an executable instruction, and the executable instruction is used for realizing the method for processing the shadow texture provided by the embodiment of this application when being executed by a processor.

The embodiment of this application provides a computer program product which includes a computer program or instruction, and the computer program or instruction is used for realizing the method for processing the shadow texture provided by the embodiment of this application when being executed by the processor.

The embodiments of this application have the following beneficial effects: the electronic device is capable of computing the corresponding second solution for each object in the virtual scene, then determine the shadow edge of each object under light source information by utilizing the rasterized pixels of the model data of each object under the second resolution and performing one-time parallel processing, and then performing one-time parallel processing again to uniformly complete the computation of the distance data corresponding to each object, namely, computing the distance data of all the objects concurrently. Therefore, the distance data of all the objects in the shadow texture can be computed concurrently in a parallel mode, then at least one piece of computed distance data is stored on the texture, thus parallel processing of the distance field shadow textures of all the objects is realized, and as a result, the computation density is improved, the data transmission batches are reduced, and finally the shadow texture processing efficiency is improved.

BRIEF DESCRIPTION OF THE DRAWINGS

FIG. 14 is an example schematic diagram of a model effect and a shadow effect according to an embodiment of this application;

FIG. 15 is an example code debugging diagram of a method for processing a shadow texture; and FIG. 16 is an example code debugging diagram of a method for processing a shadow texture according to an embodiment of this application.

DESCRIPTION OF EMBODIMENTS

Figure 1:
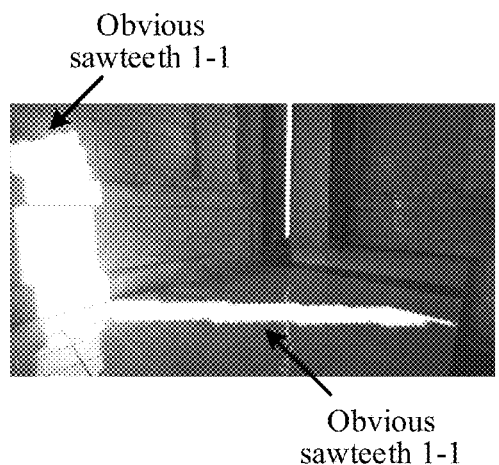
FIG. 1 is a schematic diagram of a shadow effect of a shadow maps algorithm.

The objectives, technical solutions, and advantages of this application are describe in further detail below with reference to the accompanying drawings. The described embodiments are merely examples and are not intended to be considered as limiting to this disclosure.

In the following descriptions, related "some embodiments" describe a subset of all possible embodiments. However, "some embodiments" may be the same subset or different subsets of all the possible embodiments, and may be combined with each other.

In the following descriptions, the included term "first\second" is merely intended to distinguish similar objects, and does not indicate a specific order of an object. The order of sequence of "first\second" are interchangeable if permitted.

Unless otherwise defined, meanings of all technical and scientific terms used in this specification are the same as that usually understood by a person of ordinary skill in the art. Terms used in this specification are merely intended to describe objectives of the embodiments of this application, and are not intended to limit this application.

Before the embodiments of this application are further described in detail, some terms of this disclosure are described.

1) Texture: is a two-dimensional graph and presents the appearance of the surface of an object in a virtual scene.

2) Baking (sometimes referred to as "processing" throughout this disclosure): is to convert the light and shadow relationship between objects in the virtual scene in a texture mode, and enable the objects in the virtual scene to present a more real light and shadow effect through the formed texture, avoiding complex computation in next rendering.

3) Shadow texture processing: is to pre-process and store shadow data with relatively high complexity on the texture before rendering the virtual scene so as to realize direct use of the shadow data during rendering the virtual scene.

4) Light source: is used for providing lighting and shadow effects for the objects in the virtual scene and is an important factor for rendering the virtual scene. Three different types of light sources such as parallel light, a point light source and a spotlight are mainly used in the rendering of the virtual scene.

5) Ray tracing: is a technology used for rendering the virtual scene in computer graphics. During rendering, rays are emitted to the virtual scene from each pixel in the image, then an intersection point between the object in the virtual scene and the virtual scene is computed and subjected to coloring rendering. The virtual scene with high reality can be rendered through ray tracing.

6) Shadow maps algorithm: the main process of the shadow maps algorithm includes: first, rendering the virtual scene based on a viewing angle of the light source to obtain a surface distance closest to the light source, and storing the surface distance on the texture, and then, computing the distance from the rendered object surface to the light source during rendering so as to judge whether the object is in the shadow or not.

7) Distance field shadow texture: the texture storing a distance field from the pixel center of the shadow texture to the shadow edge.

8) Signed Distance Function: used for defining the shortest distance from a given point X to the edge of a set A. The set A is given in a measurement space, and if X is on the inner side of the set A, the function value is larger than 0; with the approaching of X to the edge, the function value also approaches 0; and if X is on the outer side of A, the function value is smaller than 0. The signed distance function can be defined as that if X is on the inner side, the function value is smaller than 0, and if X is on the outer side, the function value is larger than 0.

9) Texel: is a shortened name referring to the Texture Pixel and is a basic composition unit of the textures. It is similar to a picture that is composed of a group of pixels, and in the texture space, the textures are composed of a group of texels.

10) Data transmission batch (Batch): submitting rendering data to a Graphics Processing Unit (GPU) for one-time rendering during virtual scene rendering is treated as a Batch. In application, rendering of a point, a triangle or a complex model with a high number of surfaces is treated as a rendering Batch. Due to calling of a driver layer, the number of Batch is greatly related to the rendering performance, for example, the performance of rendering the scene with 1 million triangle surfaces by 100 Batches is much higher than that of rendering the scene by 10,000 Batches. Therefore, in order to improve the rendering performance, generally, enough triangles are submitted for rendering in a one-time Batch. Similarly, when baking through compute unified device architecture or computing through other universal GPU, the submission of a one-time computation task is also treated as one-time Batch.

11) CUDA (Compute Unified Device Architecture): is a model capable of carrying out parallel programming. Based on a group of Application Programming Interfaces (API) provided by the CUDA, parallel computation can be performed on the GPU by utilizing a parallel unit, thus computation acceleration is realized.

CUDA programming relates to two parts, namely a Kernel code and a Host code. The Kernel is used for carrying out general computation on the GPU, the Host code is used for preparing Kernel running data, transmitting data to a display card and calling the Kernel for computation, thus a final result can be obtained from the GPU.

12) CUDA-based Optix: is to upload virtual scene data to the GPU, and realize acceleration of ray tracing hardware by utilizing the Ray Tracking core of the GPU so as to greatly improve the ray tracing efficiency.

13) Virtual scene: is a virtual scene displayed (or provided) on a terminal. The virtual scene may be a simulated environment of a real event, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene. The described examples do not limit the dimension of the virtual scene. For example, the virtual scene may include the sky, the land, the ocean, the virtual object, and the like. The land may include environmental elements such as the desert and the city. The user may control the virtual object to move in the virtual scene.

Shadow effects can greatly improve the level of images in a virtual scene and enhance the reality sense of the virtual scene. All the shadow effects are obtained by performing shadow rendering on the virtual scene. However, the complexity of shadow rendering is high, so often the shadow is generally made on the texture in advance, and the lighting and shadow information of objects in the virtual scene can be obtained by directly performing texture sampling during shadow rendering. Such computation mode is low in cost, but is limited by the file volume, the resolution of the texture is generally low, and the texture has many obvious sawteeth.

Exemplary, FIG. 1 is the schematic diagram of the shadow effect of the shadow maps algorithm. As shown in FIG. 1, when the resolution of the texture is 128×128 pixels, it can be clearly seen that the shadow in the virtual scene has obvious sawteeth, for example, an area pointed by an arrow in FIG. 1 has obvious sawteeth 1-1, and it is difficult to remove these sawteeth by filtering.

Figure 2:
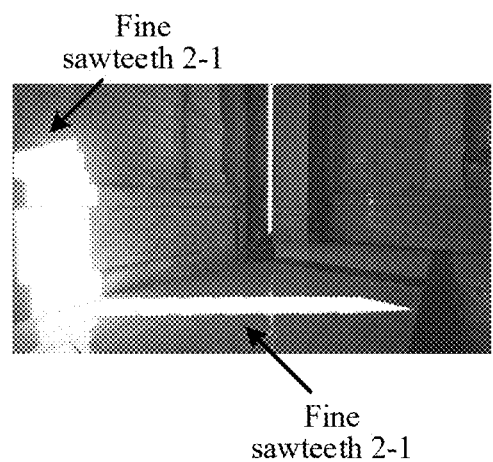
FIG. 2 is a schematic diagram of a shadow effect of a shadow maps algorithm under a high-resolution texture condition.

For above situation, although the sawteeth in the shadow can be reduced by improving the resolution of the texture, increasing of the resolution of the texture will additionally increase the volume of a video memory used for processing, the volume of the file package and the like, and the sawteeth cannot be completely removed. For example, if the resolution of the texture is increased to 256×256, it is needed to increase the volume of the file package by 4 times, but visible sawteeth still exist in the shadow in the virtual scene. For example, FIG. 2 is the schematic diagram of the shadow effect of the shadow maps algorithm under the high-resolution texture condition, it can be seen that the area pointed by the arrow in FIG. 2 still has fine sawteeth 2-1, but compared with the sawteeth in FIG. 1, the amplitude of the sawteeth in the FIG. 2 is reduced, but the sawteeth are still not removed.

Figure 3:
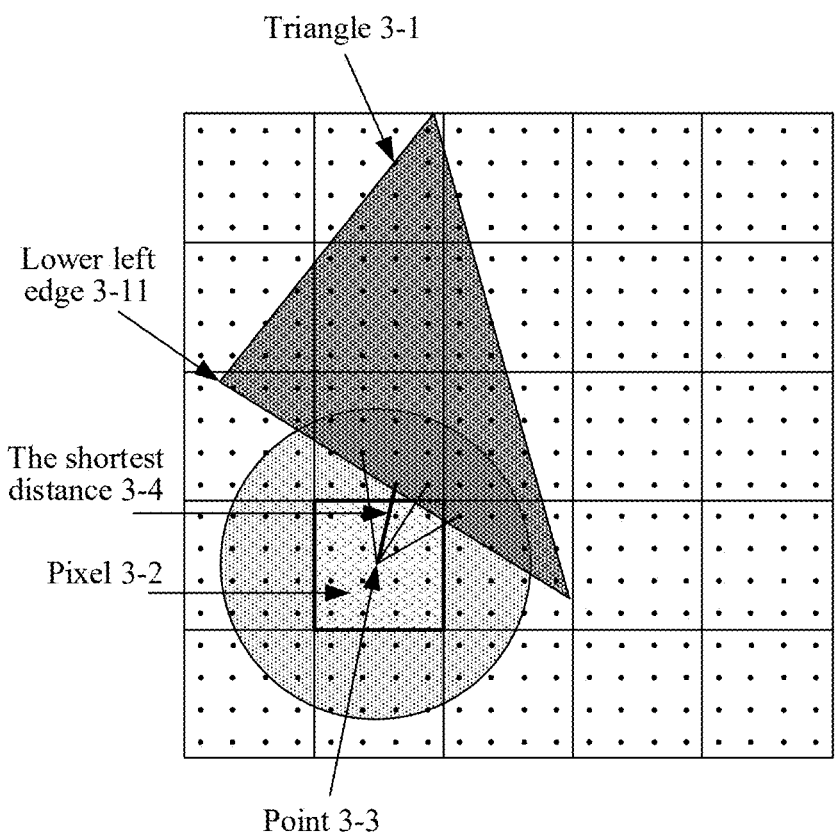
FIG. 3 is a schematic diagram of a distance field shadow texture.

Compared with the shadow maps algorithm, a distance field shadow algorithm can greatly reduce the sawteeth in the shadow under a low-resolution texture condition. Distance field shadow data is stored in the texture of the distance field shadow, and the distance field shadow data describes the distance from the pixel center to the shadow edge. As shown in FIG. 3, FIG. 3 is the schematic diagram of the distance field shadow texture. Each square (the square filled with black points) represents one pixel in the texture, and coded distance field shadow data is stored in the each pixel. In order to compute the distance field shadow data, it is needed to subdivide each pixel into sub-pixels (corresponding the black points in each square in FIG. 3, the resolution of the texture composed of the sub-pixels is larger than the resolution of the texture composed of the non-subdivided pixels). A triangle 3-1 in FIG. 3 represents a shadow area, and for a pixel 3-2 in FIG. 3, the distance from the pixel to the shadow edge is the length of a vertical line from the center (a point 3-3) of the pixel 3-2 to a lower left edge 3-11 of the triangle 3-1. Due to the fact that the shadow edge is usually in an irregular shape, the shortest distance, from the pixel center (the point 3-3) to the shadow edge, of the sub-pixels is approximated to the distance from the pixel center to the shadow edge, that is, the shortest distance, from the pixel center to the shadow edge, of the sub-pixels is treated as the distance field shadow data to be stored in each pixel of the texture. Correspondingly, in FIG. 3, the shortest distance 3-4 in the 4 distances, from the pixel center (the point 3-3) to the shadow edge, of 4 sub-pixels is treated as the distance from the pixel center to the shadow edge, and therefore, the distance field shadow data is obtained.

Therefore, the process of baking the distance field shadow texture includes the following steps:

S1: Expand the model data of the object according to texture coordinates, and rasterize the model data under high resolution (the high resolution is the resolution in representing of the object in an object space) to obtain at least one texture texel data, each texel data corresponding to one sub-pixel, and position information of the object being stored in the texel data.

S2: Emit rays to the light source from the position of each texel in GPU, and judge whether the texel is in the shadow or not.

S3: Determine the shadow edge of the object based on the result of judging whether the texel and the surrounding texel are in the shadow or not.

S4: Expand each pixel outwards from the center, search the sub-pixels of the shadow edge with high resolution, and compute the shortest distance. And S5: Treat the coded value of the shortest distance as a pixel value to store on the corresponding pixel on the texture.

In the virtual scene, the distance field shadow texture is processed more than once. For example, there are M objects in the virtual scene, and each object receives shadow projections of N light sources on average, thus it is performed for M×N times on the virtual scene; each time the distance field shadow texture is processed, it calls CUDA initiating operation for 4 times, and the final number of Batch is 4×M×N. In addition, the resolution of the distance field shadow texture is usually very low (due to being limited by the volume of the file package and the like, it is needed to select the texture with low resolution), so the computation density of GPU is low. Therefore, during obtaining the distance field shadow texture for the virtual scene, the computation density is low, and there are many data transmission batches, so the computation of the distance field shadow texture takes a long time, and as a result, the shadow texture processing efficiency is low.

The embodiment of this application provides a method, an apparatus and a device for processing a shadow texture, a non-transitory computer-readable storage medium, and a program product, aiming at providing the shadow texture processing efficiency. An example application of the electronic device for processing a shadow texture provided by the embodiment of this application is described below. The electronic device provided by the embodiment of this application may be implemented as a terminal or a server. The server may be an independent physical server, or may be a server cluster including a plurality of physical servers or a distributed system, or may be a cloud server providing basic cloud computing, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch and the like, but is not limited thereto. The terminal and the server may be directly or indirectly connected in a wired or wireless communication manner.

In some embodiments, the electronic device can be independently implemented as a server or independently implemented as a terminal, and therefore all the steps of the method for processing the shadow texture provided by the embodiment of this application are performed through the server or the terminal. In other embodiments, the electronic device can also be implemented as an apparatus cluster composed of the server and the terminal at the same time, where one part of steps in the method for processing the shadow texture provided by the embodiment of this application are realized on the server side, and the other part of steps are realized on the terminal side. The example application of the electronic device implemented as the server is described as follows.

Figure 4:
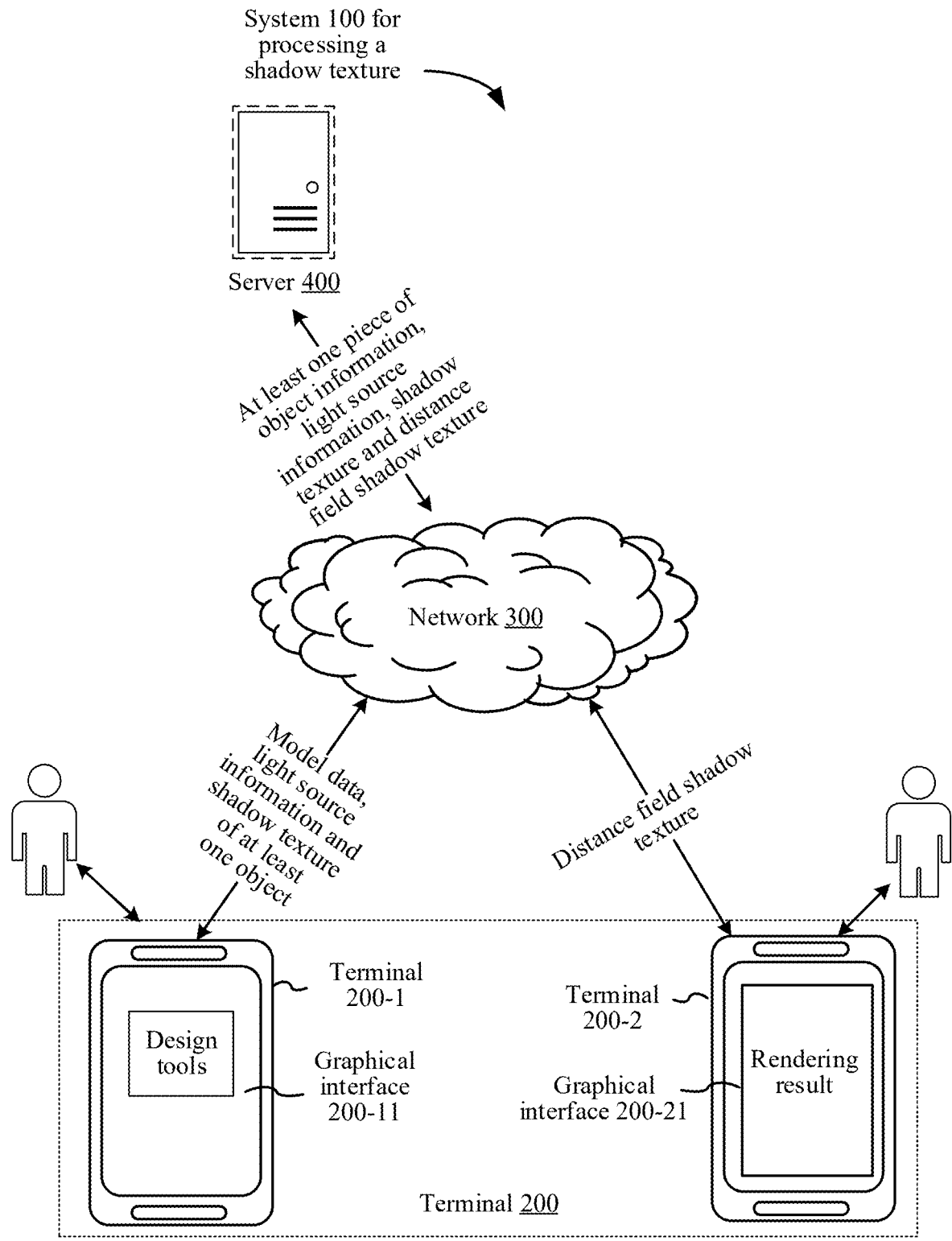
FIG. 4 is an example architecture schematic diagram of a system for processing a shadow texture according to an embodiment of this application.

As shown in FIG. 4, FIG. 4 is an example architecture schematic diagram of the system for processing the shadow texture provided by the embodiment of this application. In order to realize a rendering application for supporting a shadow texture, in a system 100 for processing the shadow texture, a terminal 200 (in some examples, a terminal 200-1 and a terminal 200-2) is connected with a server 400 of the shadow texture through a network 300, and the network 300 can be a wide area network or a local area network or a combination of the wide area network and the local area network.

The terminal 200-1 is configured to generate model data and light source information (such as characters, environment information and light source information in a game scene) of the objects in the virtual scene and generate the shadow texture with the first resolution. That is, with the adoption of design tools on a graphical interface 200-11 of the terminal 200-1, a designer can design parameters of the virtual scene, generate the model data of the objects in the virtual scene, specify parameters of the light source in the virtual scene, namely generate the light source information, and generate the shadow texture with the first resolution corresponding to each object at the same time. Then, the terminal 200-1 transmits the model data and light source information of at least one object in the virtual scene and the shadow texture with the first resolution to the server 400. The server 400 stores the model data and light source information of the at least one object in the virtual scene and the shadow texture with the first resolution corresponding to each object so as to be used when processing the shadow texture.

When the processing process of the shadow texture is started, the server 400 acquires the model data and light source information of the at least one object in the virtual scene, and also acquires the shadow texture with the first resolution corresponding to each object. The server 400 determines a corresponding second resolution according to the model data of each object, the second resolution represents the resolution in expanding of the model data of the object according to the surface area, and the second resolution is higher than the first resolution. The server 400 utilizes the rasterized pixels of the model data under the second resolution to determine the shadow edge formed by each object under the influence of the light source information in parallel; the distance from the rasterized pixels to the shadow edge corresponding to each object is computed in parallel to obtain the distance data corresponding to each object of the shadow texture with the first resolution, and the distance data corresponding to each object is correspondingly stored on the shadow texture with the first resolution, thus the distance field shadow texture corresponding to each object is obtained, and as a result, the processing process of the shadow texture is completed.

Then, the server 400 can transmit the distance field shadow texture corresponding to each object to the terminal 200-2 (such as a game installation package mode); when the terminal 200-2 starts rendering of the virtual scene (such as starting a game), the corresponding model effect is rendered for the model data of each object, and the distance data corresponding to each object is sampled from the distance field shadow texture corresponding to each object; and shadow rendering is performed on the model data of each object by utilizing the distance data so as to obtain the shadow effect corresponding to each object, and the model result and the shadow effect are displayed on a graphical interface 200-21, thus rendering of the virtual scene is realized.

Figure 5:
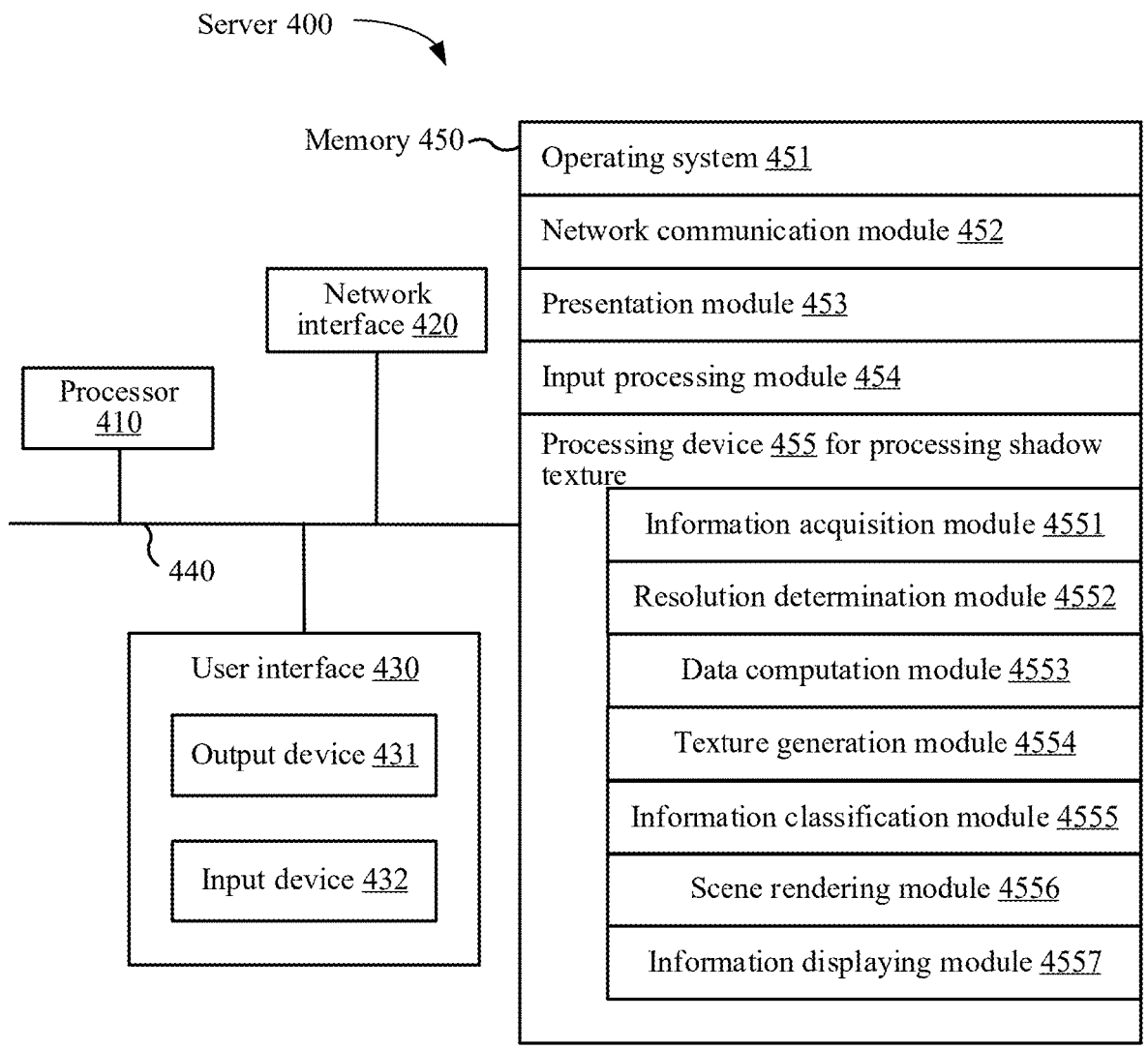
FIG. 5 is an example structure schematic diagram of a server of FIG. 4.

As shown in FIG. 5, FIG. 5 is the structure schematic diagram of the server in FIG. 4 provided by the embodiment of this application. The server 400 shown in FIG. 5 includes: at least one processor 410, a memory 450, at least one network interface 420 and a user interface 430. Components in the server 400 are coupled together by using a bus system 440. The bus system 440 may be configured to implement connection and communication between the components. In addition to a data bus, the bus system 440 further includes a power bus, a control bus, and a status signal bus. However, for ease of clear description, all types of buses in FIG. 5 are marked as the bus system 440.

The processor 410 may be an integrated circuit chip having a signal processing capability, such as a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output devices 431 that can display media content, including one or more loudspeakers and/or one or more visual display screens. The user interface 430 further includes one or more input devices 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450 may include one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in the embodiment of this application aims to include any suitable type of memories.

In some embodiments, the memory 450 may store data to support various operations. Examples of the data include a program, a module, and a data structure, or a subset or a superset thereof, which are described below by using examples.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another computing device through one or more (wired or wireless) network interfaces 420. Exemplary network interfaces 420 include: Bluetooth, wireless compatible authentication (Wi-Fi), a universal serial bus (USB), and the like.

a presentation module 453 is configured to represent information (such as a user interface for operating a peripheral device and displaying content and information) through one or more output devices 431 (such as a display screen and a loudspeaker) associated with the user interface 430; and an input processing module 454 is configured to detect one or more user inputs or interactions from one of the one or more input devices 432 and translate the detected inputs or interactions.

In some embodiments, the apparatus for processing the shadow texture provided by the embodiment of this application can be implemented in a software mode. FIG. 5 shows an apparatus 455 for processing the shadow texture stored in the memory 450; the apparatus can be the software in the forms of programs, plugins and the like and includes the following software modules: an information acquisition module 4551, a resolution determination module 4552, a data computation module 4553, a texture generation module 4554, an information classification module 4555, a scene rendering module 4556 and an information displaying module 4557, and these modules are logically arranged and can be combined or split in various examples. The following describes functions of the modules.

In some other embodiments, the apparatus for processing the shadow texture provided by the embodiment of this application may be implemented by using hardware. For example, the apparatus for processing the shadow texture provided by the embodiment of this application may be a processor in a form of a hardware decoding processor, programmed to perform the method for processing the shadow texture provided by the embodiment of this application. For example, the processor in the form of a hardware decoding processor may use one or more application specific integrated circuits (ASIC), a DSP, a programmable logic device (PLD), a complex programmable logic device (CPLD), a field-programmable gate array (FPGA), or other electronic components Exemplary, the embodiment of this application provides an electronic device for processing a shadow texture, the electronic device includes:

a memory, configured to store executable instructions; and a processor, configured to implement, when executing the executable instructions stored in the memory, the method for processing the shadow texture according to the embodiment of this application.

A method for baking the shadow texture provided by the embodiment of this application is described as follows by combining the example application and implementation of the electronic device provided by the embodiment of this application. The embodiment of this application can be realized through a cloud technology. The cloud technology is a hosting technology that unifies a series of resources such as hardware, software, and networks in a wide area network or a local area network to implement computing, storage, processing, and sharing of data.

Figure 6:
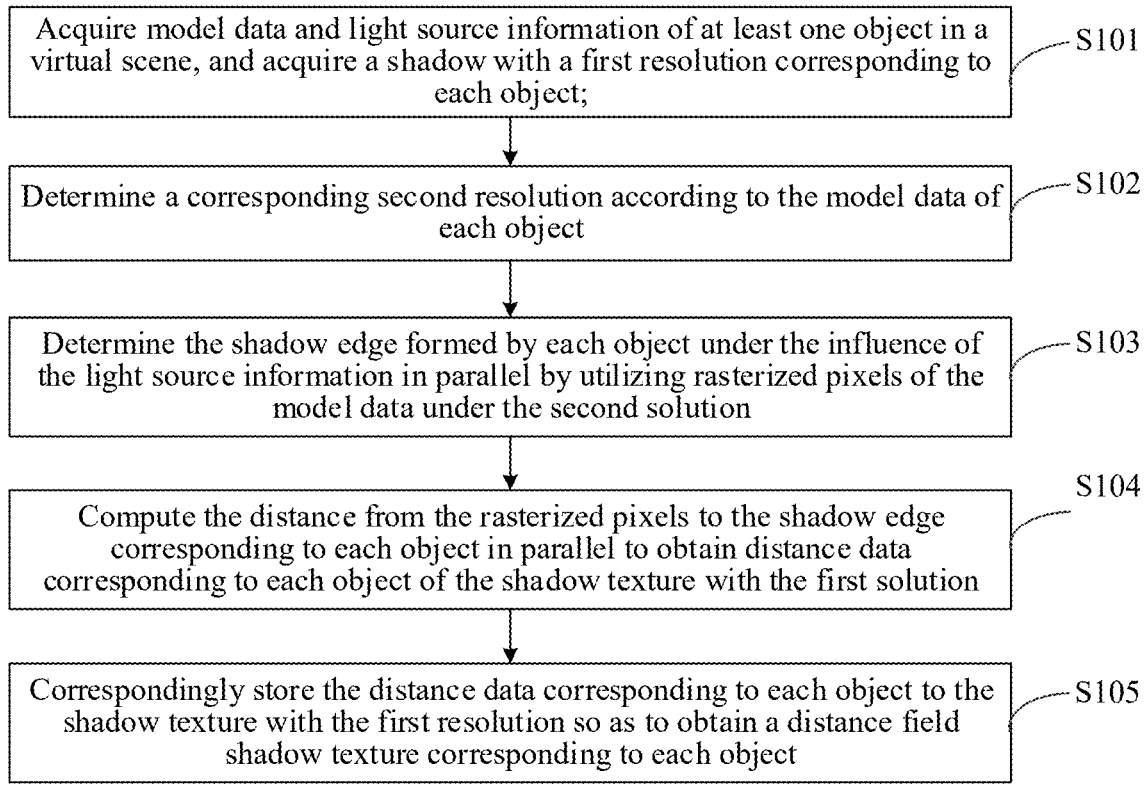
FIG. 6 is an example flow schematic diagram of a method for processing a shadow texture according to an embodiment of this application.

As shown in FIG. 6, FIG. 6 is the optional flow schematic diagram of the method for processing the shadow texture provided by the embodiment of this application, and it will be described in combination with the steps shown in FIG. 6.

S101: Acquire model data and light source information of at least one object in the virtual scene, and acquire the shadow texture with the first resolution corresponding to each object.

The embodiment of this application is implemented in a scene of performing the shadow texture processing on the virtual scene, namely, a scene of baking the distance data to the texture. When starting to process the shadow texture, the electronic device is capable of acquiring the model data of each object in the virtual scene from a data packet used for storing various information of the virtual scene or a data set (such as a graphic data file of a game and a special effect data file of a movie) so as to obtain the model data information of the at least one object, and meanwhile, the light source information of the virtual scene can be obtained, and the shadow texture with the first resolution corresponding to each object can also be obtained, thus facilitating the subsequent shadow texture processing according to the data.

In this step, the shadow texture with first resolution obtained by the electronic device is an empty shadow texture (namely, the pixel value of each pixel in the shadow texture is 0 or a value obtained through initialization). The shadow texture with the first resolution obtained by the electronic device can be treated as the distance field shadow texture corresponding to each object after the obtained distance data are coded and stored in the subsequent step.

The data packet or the data set used for storing various information of the virtual scene can be received from a working terminal of the designer and can also be automatically generated according to demand conditions input by the designer. In some embodiments, the electronic device is capable of immediately acquiring the model data and light source information of the at least one object and the shadow texture with the first resolution after receiving the data packet or the data set which is transmitted from the working terminal of the designer and used for storing various information of the virtual scene so as to start the processing process of the shadow texture, or the electronic device is capable of storing the received data packet or data set which is transmitted from the working terminal of the designer and used for storing various information of the virtual scene in a storage space, and starting to acquire the model data and light source information of the at least one object and the shadow texture with the first resolution after a specified time is reached or an instruction of the designer is received, and then starting the processing process of the shadow texture. However, the model data and light source information of the at least one object and the shadow texture with the first resolution can also be directly transmitted to the electronic device through the working terminal of the designer.

The model data of each object of the virtual scene may include information such as the position, the normal, the surface area and the size of the object. The light source information of the virtual scene refers to parameters of the light source in the virtual scene, and the parameters include information such as the position, the intensity, the color and the lighting range of the light source.

The light source information does not refer to the parameters of one light source but the general name of the parameters of all the light sources in the virtual scene, that is, the light source information can include a plurality of pieces of sub-light source information, and each piece of sub-light source information corresponds to one light source in the virtual scene.

The first resolution does not necessarily refer to one resolution. That is, the first resolution can further include a plurality of first sub-resolutions, and the plurality of first sub-resolutions can be different from one another. For some virtual scenes, it is usually needed to comprehensively consider the effects under different resolutions during design, so the resolution of the shadow texture is more than one, and each first sub-resolution in the first resolution can vary or be a default resolution. Exemplary, the value of the first sub-resolution can be 128×128 pixels or 64×64 pixels, and can also be set to other values.

In some embodiments, the virtual scene can be a game scene, or a CG animation scene, or other scenes to be rendered.

S102: Determine the corresponding second solution according to the model data of each object.

The electronic device is capable of computing the resolution for completely expanding each object in the virtual scene by utilizing the model data of each object, and determining the computed resolution as the second resolution. That is, in the embodiment of this application, the second resolution represents the resolution in expanding of the model data according to the surface area.

In some embodiments, after acquiring the model data of objects of the virtual scene, the electronic device is capable of extracting the surface area of each object from the model data of each object, and then multiplying by the surface area of each object according to the representation of the resolution per square meter of an object space, thus obtaining the second resolution for completely expanding the model data of each object.

Exemplary, it is assumed that 100*100 pixels are used for representation per square meter in the object space, and for one object with the surface area of 2 square meters, the texture resolution in expanding of the object is 200*200 pixels, namely, the second resolution of the object is 200*200 pixels.

In other embodiments, the electronic device is further capable of matching the model data of each object with each model in the model database, and determining the resolution corresponding to the model matched with the model data of each object as the second resolution of the object corresponding to the information of each object.

The second resolution computed by the electronic device is the most basic and bottommost resolution during baking and rendering, and the second resolution is generally high; the first resolution is generally limited by the volume of the installation package and other factors, so it is not too high; therefore, the second resolution is higher than the first resolution, and there is a multiple relationship between the second resolution and the first resolution, that is, the shadow texture with the second resolution can be obtained by performing super-sampling on the shadow texture with the first resolution, and the shadow texture with the first resolution can be obtained by sampling the shadow texture with the second resolution.

S103: Determine the shadow edge formed by each object under the influence of the light source information in parallel by utilizing rasterized pixels of the model data under the second resolution.

After computing the second resolution corresponding to each object, the electronic device is capable of synchronously determining the shadow edge of each object in the virtual scene by combining the light source information and the rasterized pixels, rasterized under the corresponding second resolution, of the model data of each object. That is, in the embodiment of this application, the electronic device is capable of determining the shadow edge formed by each object under the influence of the light source information.

The electronic device is capable of rasterizing the model data corresponding to each object in the at least one object under the second resolution corresponding to each object, and then extracting the shadow edge of each object under the light source information according to the rasterized pixels. When the electronic device determines the corresponding shadow edges for all the objects, at least one shadow edge in one-to-one correspondence with the at least one object can be obtained.

Exemplary, when there are N objects in the virtual scene, the electronic device is capable of simultaneously determining the shadows of the N objects in parallel, thus the distance data of the N objects can be conveniently synchronously determined subsequently, and the parallelism is improved to N times of the original parallelism, and as a result, the computation density may be improved, the number of data transmission batches may be reduced, and finally the distance field shadow texture processing efficiency may be improved.

If the first resolution includes one first sub-resolution, the electronic device can carry out parallel determination on the shadow edge for each object in the virtual scene. If the first resolution includes the plurality of first sub-resolutions, the electronic device is capable of performing parallel determination on the shadow edge of each object in the virtual scene for each first sub-resolution; the electronic device is further capable of determining the shadow edge of each object in the virtual scene for each first sub-resolution in parallel (meanwhile, two-layer parallel computation is carried out, the parallel computation at one layer is for each first sub-resolution, and the parallel computation at another layer is for each object in each first sub-resolution), so that the distance field shadow texture processing efficiency is further improved.

Exemplary, when the first resolution includes N first sub-resolutions, the electronic device substantially generates the distance field shadow textures of the virtual scene substantially for the N first sub-resolutions, thus N distance field shadow textures are obtained. Therefore, the electronic device is capable of generating corresponding distance field shadow textures one by one for the N first sub-resolutions, or synchronously generating corresponding distance field shadow textures for the N first sub-resolutions.

S104: Compute the distance from the rasterized pixels to the shadow edge corresponding to each object in parallel to obtain distance data corresponding to each object of the shadow texture with the first resolution.

Then the electronic device is capable of simultaneously searching the distance from the rasterized pixels corresponding to the model data of each object to the shadow edge corresponding to each object, and determining the distance from the rasterized pixels to the shadow edge corresponding to each object or the distance from the pixels screened out from the rasterized pixels to the shadow edge corresponding to each object as the distance data corresponding to each object. When the electronic device completes the computation of the distance data of the at least one object, at least one piece of distance data corresponding to the at least one object one to one can be obtained.

S105: Correspondingly store the distance data corresponding to each object to the shadow texture with the first resolution so as to obtain the distance field shadow texture corresponding to each object.

After obtaining the at least one piece of distance data corresponding to the at least one object, the electronic device is capable of correspondingly storing each piece of obtained distance data on the shadow texture with the first resolution corresponding to each object, thus determining the shadow texture storing the distance data of each object in the virtual scene as the distance field shadow texture. Therefore, the electronic device can obtain the distance field shadow texture corresponding to each object in the virtual scene.

When the distance field shadow texture is obtained for the virtual scene, the embodiment of this application has the advantages that the electronic device is capable of computing the corresponding second resolution for each object in the virtual scene, then performing one-time parallel processing to determine the shadow edge of each object under the light source information, then performing one-time parallel processing once again to uniformly complete the computation of the distance data corresponding to each piece of object information, namely, computing the distance data of all objects at one time, and storing at least one piece of computed distance data on the texture, thus realizing the parallel processing of distance field shadow textures of all objects; and therefore, the computation density is improved, the data transmission batches are reduced, and finally the shadow texture processing efficiency is improved.

In some embodiments, the light source information includes: a plurality of pieces of sub-light source information; before determining the shadow edge formed by each object under the influence of the light source information in parallel by utilizing rasterized pixels of the model data under the second resolution, namely, before S103, the method further can include: S106-S107 as follows:

S106: Screen out corresponding matched sub-light source information for each object from the plurality of pieces of sub-light source information.

The light source information of the virtual scene includes a plurality of pieces of sub-light source information; each piece of sub-light source information has a corresponding sub-light source; however, not every object is influenced by all the sub-light sources, so the electronic device screens out the sub-light source information causing influence on each object from the plurality of sub-light sources for each object, and the information of these sub-light sources is treated as the matched sub-light source information corresponding to each object.

The influence of the sub-light sources on the object refers to lighting to the object or shadow to the object, and therefore the matched sub-light source information represents the information of the sub-light sources causing lighting or shadow influence on the object.

The electronic device judges whether the sub-light sources affect an object or not by combining the type of the sub-light sources. For example, when a sub-light source is sunlight, the sub-light source will affect all objects, thus the matched sub-light source information corresponding to each piece of object information will include the information of the sub-light source. When a sub-light source is a point light source or a spotlight, the electronic device will judge whether the object is in the influence radius of the sub-light source or not; if the object is in the influence radius, the object matched sub-light source information corresponding to the object includes the information of the sub-light source, and otherwise, the information of the sub-light source is not included.

In some embodiments, the electronic device determines corresponding matched sub-light source information for each piece of object information, and actually, an index relationship is established between the object and the sub-light source, and therefore, the information of the sub-light source causing influence on the object can be quickly indexed for each object during determining the shadow edge.

Figure 7:
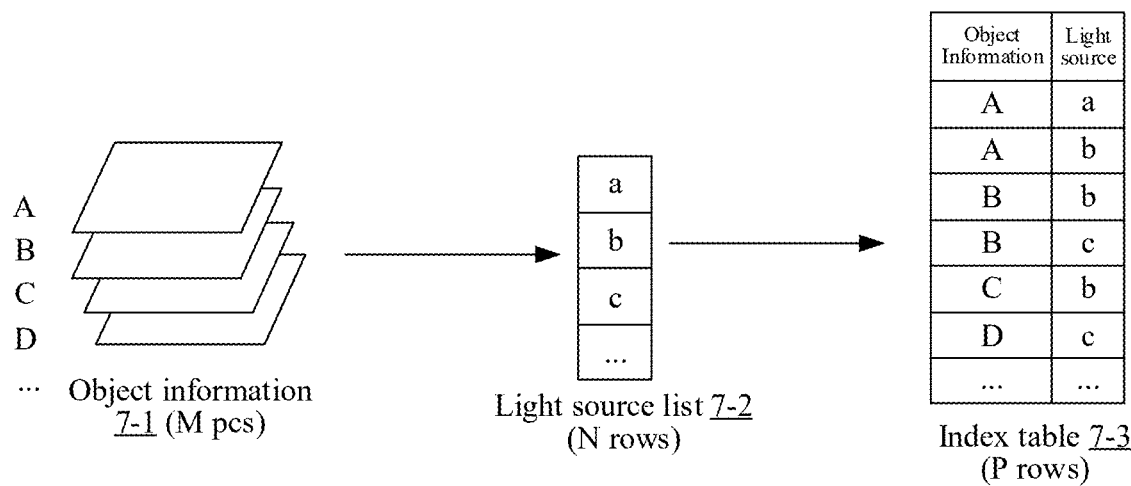
FIG. 7 is an example schematic diagram of an index relationship between an object and sub-light source information according to an embodiment of this application.

Exemplary, FIG. 7 is the schematic diagram of the index relationship between the object and sub-light source information provided by the embodiment of this application. As shown in FIG. 7, there are M pieces of object information 7-1 and N sub-light sources, each object is represented by one layer, and all pieces of sub-light source information form an N-row light source list 7-2. The electronic device is capable of extracting the sub-light source causing influence on the object for each object so as to obtain matched sub-light source information; for example, in the case of an object A, the matched sub-light source information is information of a light source a and information of a sub-light source B; in the case of an object B, the matched sub-light source information is information of the sub-light source b and information of a sub-light source b; in the case of an object C, the matched sub-light source information is information of the sub-light source b; and in the case of an object D, the matched sub-light source information is information of the sub-light source c. And so on, an index table 7-3 between the objects and the sub-light source information will be generated until the matched sub-light source information is determined for all the objects, and the index table has P rows.

S107: Rasterize the model data of each object under the second resolution to obtain the rasterized pixels of the model data under the second resolution.

The electronic device is capable of converting the position, the normal and other data of each vertex of the model data of each object into a two-dimensional graph under the second resolution, namely, determining the pixels at corresponding positions on a screen so as to realize the rasterizing of the model data under the second resolution, thus obtaining the rasterized pixels.

Figure 8:
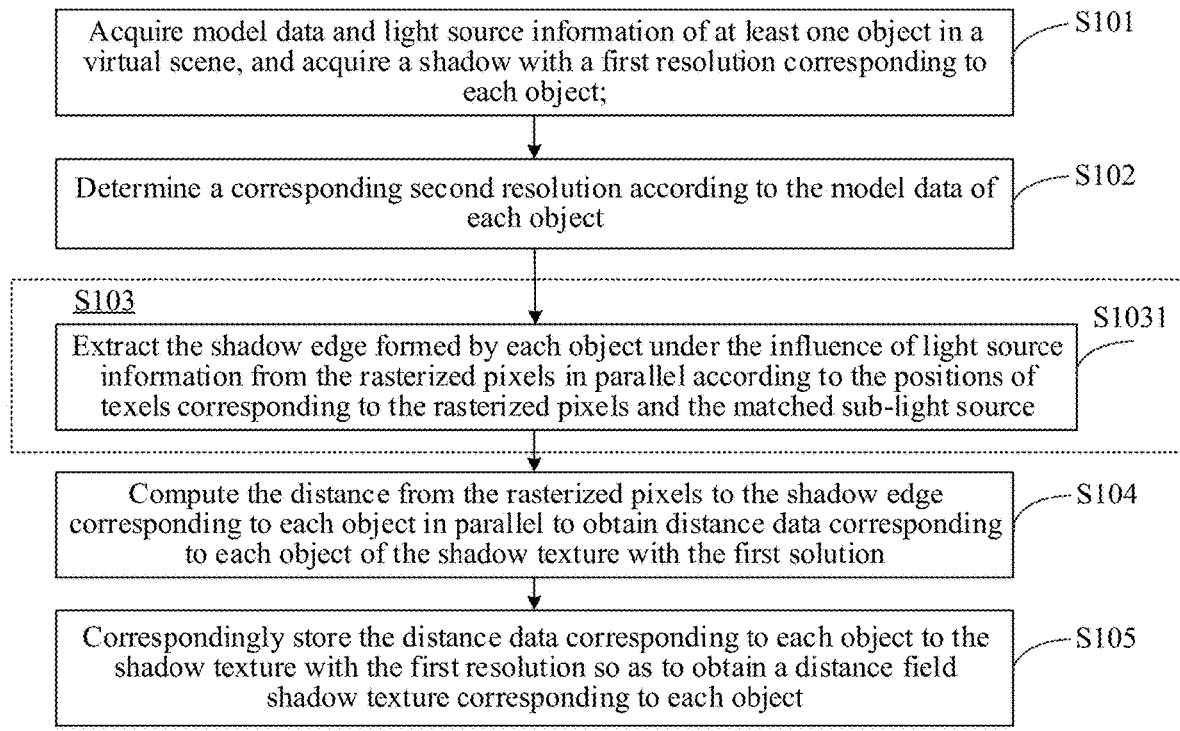
FIG. 8 is an example flow schematic diagram of a method for processing a shadow texture according to an embodiment of this application.

Based on the FIG. 6, as shown in FIG. 8, FIG. 8 is another example flow schematic diagram of the method for processing the shadow texture provided by the embodiment of this application. In some embodiments, the determining the shadow edge formed by each object under the influence of the light source information in parallel by utilizing the rasterized pixels of the model data under the second resolution, namely, the implementation process of S103, can include: S1031:

S1031: Extract the shadow edge formed by each object under the influence of light source information from the rasterized pixels in parallel according to the positions of texels corresponding to the rasterized pixels and the matched sub-light source information.

There may be a corresponding relationship between the rasterized pixels and the texel, and the corresponding relationship is determined during designing the virtual scene. The electronic device expands the object according to the texture coordinates to obtain the position of the texel, that is, the position of the texel is obtained by performing texture coordinate expanding on each piece of object information.

In some embodiments, the electronic device is capable of emitting rays to the matched light source information from the position of the texel to determine whether the texel is in the shadow or not so as to determine the shadow area, and then performing edge extraction on the shadow area to obtain the shadow edge. In other embodiments, the electronic device is further capable of judging whether the position of the texel is at the edge of the irradiation range of the matched sub-light source information, and determining the rasterized pixel corresponding to the texel as the shadow edge when the position of the texel is at the edge of the irradiation range of the matched sub-light source information.

In some embodiments, the electronic device is capable of completing the extraction of the shadow edges of all objects at one time through parallel tasks, thus the parallelism in shadow edge extraction is increased, the computation density is improved, and the data transmission batches are reduced, and as a result, the shadow texture processing efficiency is improved.

In some embodiments, the extracting the shadow edge formed by each object under the influence of light source information from the rasterized pixels in parallel according to the positions of the texels corresponding to the rasterized pixels and the matched sub-light source information is the implementation process of S1031 and can include: S201-S202 as follows:

S201: Emit rays to the matched sub-light source information from the positions of the texels to perform parallel shadow coverage judgment on the rasterized pixels of each object so as to obtain shadow coverage information;

the electronic device is capable of emitting rays to the matched sub-light source information from the positions of the texels corresponding to the rasterized pixels, judging whether the rays can reach the matched sub-light source information (if there are other texels on the ray route from the positions of the texels to the matched sub-light source information, the rays cannot reach the matched sub-light source information, otherwise, the rays can reach the matched sub-light source information), and consequently, judging that the rasterized pixels corresponding to the texels are in the shadow if the rays cannot reach the matched sub-light source information, namely judging that the rasterized pixels of each object are covered by the shadow, thus obtaining shadow coverage information representing that the rasterized pixels are in the shadow; and otherwise, judging that the rasterized pixels are outside the shadow if the rays can reach the matched sub-light source information so as to obtain the shadow coverage information representing that the rasterized pixels are not covered by the shadow. That is, the shadow coverage information represents whether the texels are in the shadow.

S202: Determine the shadow edge formed by each object under the influence of the light source information by using the shadow coverage information.

After determining the shadow coverage information of the rasterized pixels, the electronic device is capable of determining a boundary of the shadow according to the rasterized pixels in the shadow and the rasterized pixels outside in the shadow, and the boundary is the shadow edge. According to this mode, the electronic device can extract the corresponding shadow edge for each object.

In some embodiments, the electronic device is capable of determining whether the rasterized pixels of each object are in the shadow or not according to the matched sub-light source information and the positions of the texels, and then extracting the shadow edge corresponding to each object in parallel according to the condition whether the rasterized pixels are in the shadow or not. Therefore, the electronic device completes parallel extraction of the shadow edge corresponding to each object, and the computation density is improved.

In some embodiments, the determining the shadow edge formed by each object under the influence of the light source information by using the shadow coverage information is the implementation process of S202 and can include: S2021-S2023 as follows:

S2021: Classify the rasterized pixels into shadow covered pixels and shadow uncovered pixels according to the shadow coverage information.

S2022: Screen to obtain edge pixels with adjacent rasterized pixels as shadow uncovered pixels from the shadow covered pixels.

The electronic device is capable of determining whether the adjacent rasterized pixels are shadow uncovered pixels or shadow covered pixels for each shadow covered pixel. When a shadow covered pixel is adjacent to the shadow uncovered pixel, the electronic device can determine the shadow covered pixel as the edge pixel.

S2023: Simultaneously splice the edge pixels to obtain the shadow edge of each object.

The electronic device is capable of connecting all the edge pixels to determine the shadow edge corresponding to each object, thus facilitating subsequent distance data computation.

In some embodiments, during computing the distance parameters corresponding to each object, the electronic device actually computes the distance from the pixel center of the shadow texture with the first resolution to the shadow edge of each object at the same time, however, in the embodiment of this application, the distance from the pixel center of the shadow texture with the first solution to the shadow edge of each object is computed by means of the rasterized pixels. The computation of the distance to the shadow edge of an independent object is treated as an independent computation task; therefore, when the electronic device computes the distance from the pixel of the shadow texture with the first resolution to the shadow edge corresponding to each object in parallel, numbers of computation tasks are performed on the objects in parallel, and the parallelism can be converted into the times of numbers of the original objects (namely, when the number of the objects is N, the parallelism is converted into N times).

Figure 9:
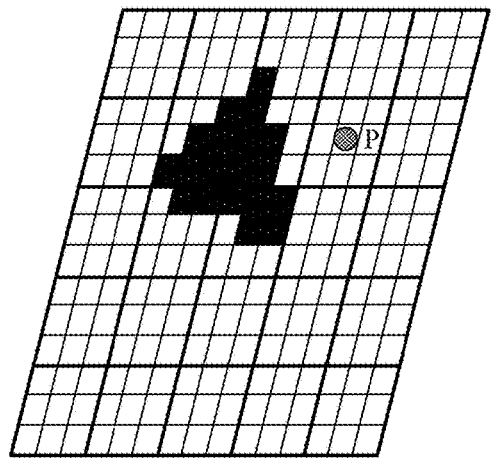
FIG. 9 is an example schematic diagram of a pixel center of a shadow texture with a first resolution and a shadow edge according to an embodiment of this application.

Exemplary, the embodiment of this application provides the schematic diagram of the pixel center of the shadow texture with the first resolution and the shadow edge. As shown in FIG. 9, the shadow is composed of black grids, the point P is the pixel center of the shadow texture with the first resolution, and the electronic device actually computes the minimum distance from the point P to the edge of the shadow composed of the black grids.

The computation process of the distance data corresponding to each object is described in detail as follows.

In some embodiments, the electronic device is capable of searching the distance field shadow data in parallel for each shadow edge based on at least one super-sampling parameter, so that the parallel extraction of at least one distance field shadow data can be realized, the parallelism is improved, the computation density is improved, the data transmission batches are reduced, and finally the shadow texture baking efficiency is improved.

Figure 10A:
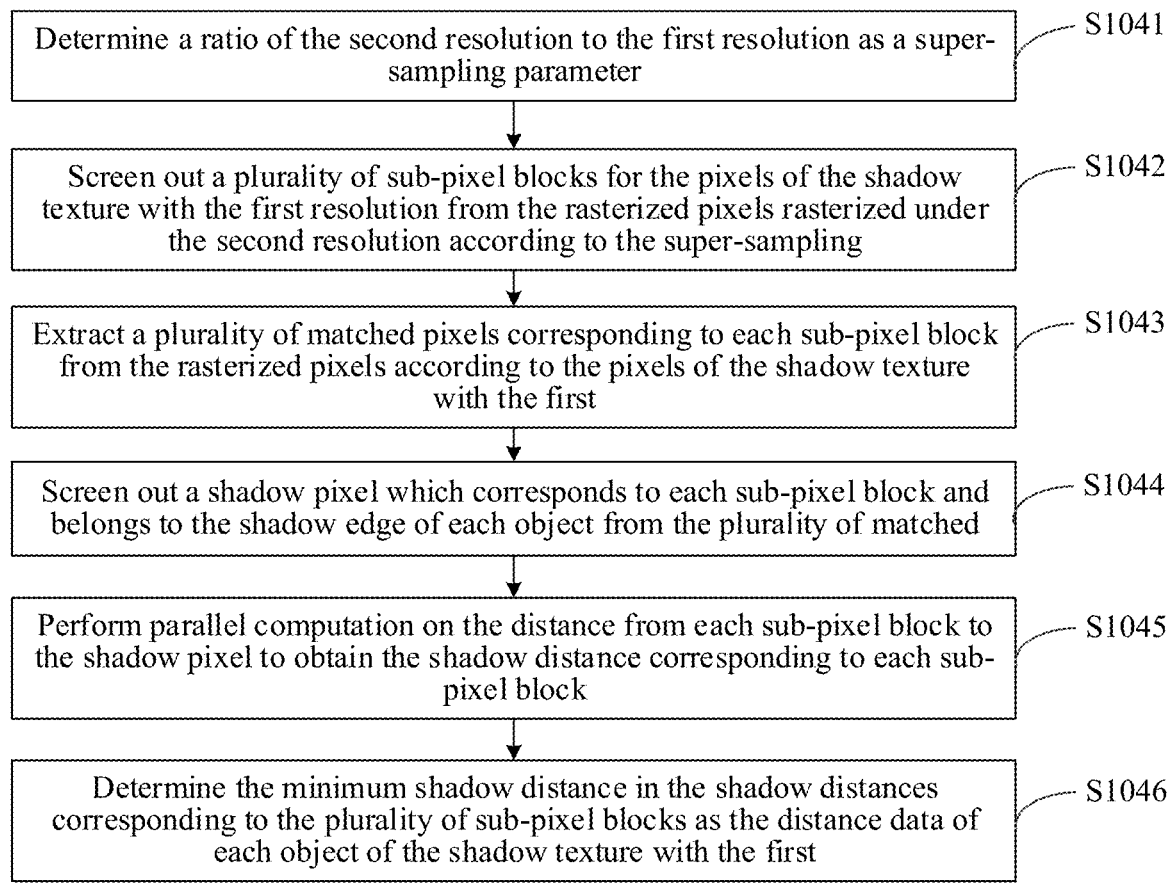
FIG. 10A is an example flow schematic diagram of a method for processing a shadow texture according to an embodiment of this application.

As shown in FIG. 10A, FIG. 10A is another example flow schematic diagram of the method for processing the shadow texture provided by the embodiment of this application. In some embodiments, the computing the distance from the rasterized pixels to the shadow edge corresponding to each object in parallel to obtain distance data corresponding to each object of the shadow texture with the first resolution is the implementation process of S104 and can include: S1041-S1046 as follows:

S1041: Determine a ratio of the second resolution to the first resolution as a super-sampling parameter.

When processing the distance field shadow texture, the shortest distance from the pixel center of the shadow texture with the first resolution to the shadow edge is computed, and the shadow edge is generally determined according to the rasterized pixel under the second resolution. Therefore, when the electronic device searches the distance data corresponding to each object in parallel, firstly the second resolution is treated as a numerator, and the first resolution is treated as a denominator for comparison, the obtained ratio is the super-sampling parameter. The super-sampling parameter represents the pixel conversion relationship between the first resolution and the second resolution, and it indicates that the rasterized pixels can be obtained by performing super-sampling on the pixels of the shadow texture with the first resolution by many times.

Since there may be a corresponding relationship between the second resolution and the object, the super-sampling parameter computed according to the second resolution also has the corresponding relationship with the object, that is, each object has the corresponding super-sampling parameter.

Figure 10B:
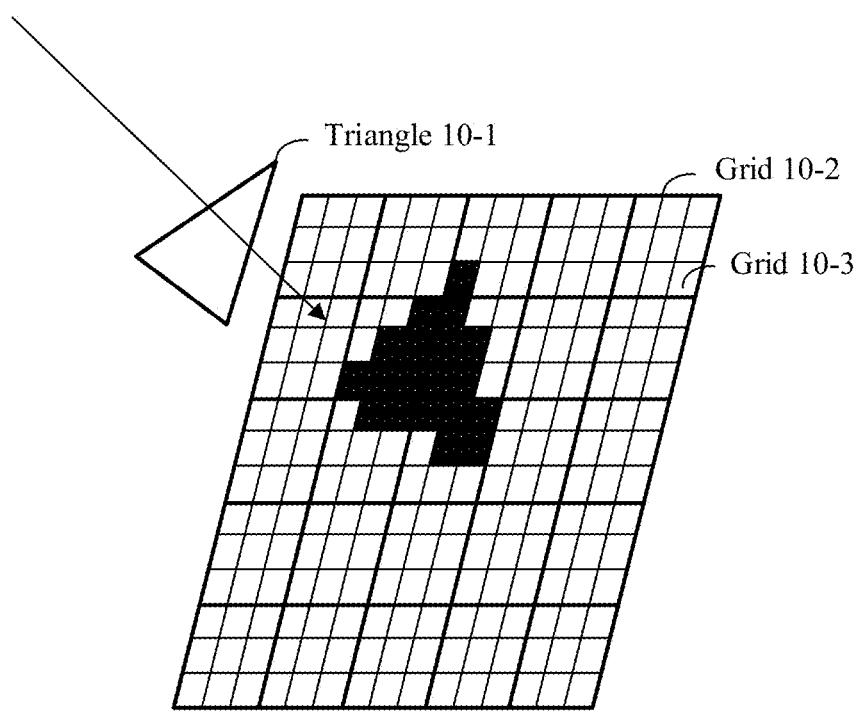
FIG. 10B is an example comparison schematic diagram of a first resolution and a second resolution according to an embodiment of this application.

Exemplary, the embodiment of this application provides the comparison schematic diagram of the first resolution and the second resolution, as shown in FIG. 10B, a triangle 10-1 is an object, an area formed by black grids is the shadow corresponding to the object, a large grid (such as a grid 10-2) formed by 3×3 small grids is the pixel of the shadow texture with the first resolution, and each small grid (such as a grid 10-3) is the rasterized pixel. Therefore, there is a corresponding relationship between the pixel of the shadow texture with the first resolution and the rasterized pixel under the second resolution, that is, the 3×3 rasterized pixels can form the pixel of the shadow texture with the first resolution.

S1042: Screen out a plurality of sub-pixel blocks for the pixels of the shadow texture with the first resolution from the rasterized pixels rasterized under the second resolution according to the super-sampling coefficient.

The electronic device is capable of determining a plurality of pixels corresponding to the pixels of the shadow texture with the first resolution from the rasterized pixels according to the pixel conversion relationship between the first resolution and the second resolution represented by the super-sampling parameters. The process can be regarded as partitioning of the pixels of the shadow texture with the first resolution, so each rasterized pixel can be regarded as a sub-pixel block of the corresponding pixel of the shadow texture with the first resolution, and therefore, the electronic device can obtain a plurality of pixel blocks for the pixels of the shadow texture with the first resolution.

That is, the size of the sub-pixel block determined by the electronic device for the pixel of the shadow texture with the first resolution is the same as that of the rasterized pixel under the second resolution.

Figure 11:
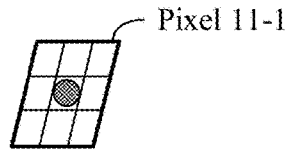
FIG. 11 is an example schematic diagram of sub-pixel blocks according to an embodiment of this application.

Exemplary, FIG. 11 is the schematic diagram of the sub-pixel blocks provided by the embodiment of this application, the electronic device is capable of screening out 3×3 pixels from the rasterized pixels for a pixel 11-1 of the shadow texture with the first resolution, and determining the obtained 9 sub-pixel blocks as a plurality of sub-pixel blocks corresponding to the pixels of the shadow texture with the first resolution; and the center of the pixel of the shadow texture with the first resolution is in the most central sub-pixel block in the 9 sub-pixel blocks.

S1043: Extract a plurality of matched pixels corresponding to each sub-pixel block from the rasterized pixels according to the pixels of the shadow texture with the first resolution.

The electronic device is capable of primarily screening out some pixels for each sub-pixel block from all rasterized pixels rasterized under the second resolution according to the pixels of the shadow texture with the first resolution, and treating the pixels as the matched pixels so as to obtain a plurality of matching pixels corresponding to each sub-pixel block.

The electronic device is capable of determining the pixel corresponding to each sub-pixel block from the rasterized pixels, and then treating adjacent pixels of the pixel corresponding to each sub-pixel block as the matched pixels. The electronic device is further capable of selecting some pixels with a rule with the pixels of the shadow texture with the first resolution from the rasterized pixels, and then selecting a plurality of matched pixels from the pixels, for example, selecting the rasterized pixels with the positions in the pixel set the same as a sub-pixel block at the pixel of the shadow texture with the first resolution from the pixel set (the rasterized pixels in the pixel set are spliced to form the pixels of the shadow texture with the first resolution) corresponding to the pixels of the shadow texture with the first resolution in the rasterized pixels.

S1044: Screen out a shadow pixel which corresponds to each sub-pixel block and belongs to the shadow edge of each object from the plurality of matched pixels.

Then, the electronic device judges whether each matched pixel belongs to the shadow edge corresponding to each object or not, and selects the matched pixels belonging to the shadow edge of each object as the shadow pixels.

S1045: Perform parallel computation on the distance from each sub-pixel block to the shadow pixel to obtain the shadow distance corresponding to each sub-pixel block.

Parallel computation is performed on the distance from each sub-pixel block to the shadow pixel to obtain a shadow distance corresponding to each sub-pixel block, and the pixel distances corresponding to the plurality of sub-pixel blocks respectively are determined as the plurality of shadow distances when obtaining the corresponding pixel distances of the plurality of sub-pixel blocks respectively.

The pixel distance from each sub-pixel block to the shadow pixel can be represented by utilizing the number of pixels of each sub-pixel block, namely, the number of the pixel intervals between the pixels, corresponding to the pixels of the shadow texture with the first solution, in the rasterized pixels and the shadow pixels, and can also be represented by utilizing the linear distance from the pixels, corresponding to the pixels of the shadow texture with the first resolution, in the rasterized pixels to the shadow pixels.

Figure 12:
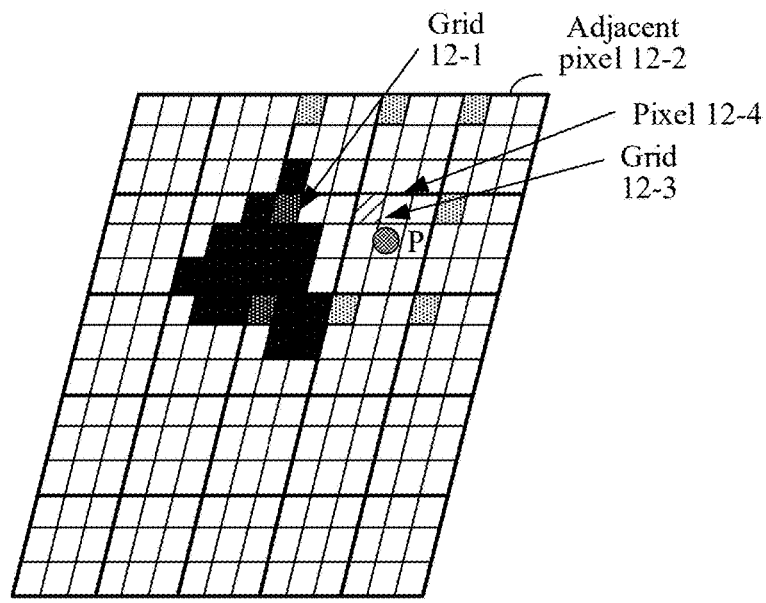
FIG. 12 is an example schematic diagram of computing shadow distance according to an embodiment of this application.

Exemplary, FIG. 12 is the schematic diagram of computing shadow distance provided by the embodiment of this application. As shown in FIG. 12, black grids form the shadow, grids filled with point cloud are the matched pixels determined by the electronic device for each sub-pixel block, grids filled with oblique lines are sub-pixel blocks, and a point P is the pixel corresponding to the pixel center with the first resolution in the rasterized pixels. The electronic device computes the sub-pixel block while the grids filled with transverse lines are at the edge of the shadow formed by the block grids, namely the distance of the grids 12-1 filled with the point cloud, and the distance is the shadow distance.

The electronic device is capable of screening out a plurality of matched pixels for each sub-pixel block, and screening out the matched pixels belonging to the current shadow edge from the plurality of matched pixels to obtain shadow pixels, thus computing to obtain the distance from each sub-pixel block to the corresponding shadow pixel; and in this way, the distance search can be shared to each sub-pixel block.

S1046: Determine the minimum shadow distance in the shadow distances corresponding to the plurality of sub-pixel blocks as the distance data of each object of the shadow texture with the first resolution.

After obtaining shadow distances in one-to-one correspondence with the plurality of sub-pixel blocks, the electronic device is capable of comparing the shadow distances by volume to determine the minimum shadow distance, and then selecting the minimum shadow distance as the distance data of each object; and it is needed to store the distance data in the shadow texture with the first resolution subsequently.

In an embodiment of this application, the computing of the shadow from the sub-pixel block to the shadow edge is actually to implement the distance searching process by all sub-pixel blocks. However, the searching processes corresponding to all sub-pixel blocks are carried out in parallel, that is, the electronic device is capable of synchronously computing the distances from the sub-pixel blocks to the shadow edge, thus the distance data computation parallelism of each object is improved, and the shadow texture processing efficiency is improved. In some embodiments, the extracting the plurality of matched pixels corresponding to each sub-pixel block of the at least one sub-pixel block from the rasterized pixels according to the pixels of the shadow texture with the first resolution is the implementation process of S1043 and can include: S301-S304 as follows:

S301: Select adjacent pixels for the pixels of the shadow texture with the first resolution.

The electronic device is capable of selecting the pixels around a pixel of the shadow texture with the first resolution from all pixels of the shadow texture with the first resolution, and the pixels are adjacent pixels.

The electronic device is capable of selecting 4 pixels that are upper, lower, left and right pixels as the adjacent pixels, and can also select all 8 surrounding pixels as the adjacent pixels.

S302: Extract a pixel set corresponding to the adjacent pixels from the rasterized pixels.

Then, electronic device is capable of selecting a pixel set capable of forming the adjacent pixels from rasterized pixels based on the corresponding relationship between the pixels of the shadow texture with the first resolution and the rasterized pixels.

Exemplary, as shown in FIG. 12, the pixel set in the second solution corresponding to an adjacent pixel 12-2 of the pixel in the first solution refers to 9 small grids in the adjacent pixel 12-2 (the 9 small grids are the pixels in the second solution), the electronic device selects these pixels as the pixel set corresponding to the adjacent pixel.

S303: Determine the position of each sub-pixel block in the pixels with the first resolution.

S304: Process each sub-pixel block by extracting a plurality of pixels with the same position as a sub-pixel block from a pixel set, and taking the extracted plurality of pixels as a plurality of matched pixels corresponding to each sub-pixel block.

The electronic device is capable of firstly judging the position of each sub-pixel block at the pixel with the first resolution, and then extracting the pixels at the same position in a pixel set, where the extracted pixels are the matched pixels corresponding to each sub-pixel block.

Exemplary, as shown in FIG. 12, a grid 12-3 (the sub-pixel block) filled with the oblique line is at the upper left corner of the pixel under the first resolution, the adjacent pixels are eight 3×3 large grids around a pixel 12-4 under the first resolution, and the electronic device is capable of selecting the pixel at the upper left corner in each large grid as the matched pixel.

In some embodiments, the electronic device is capable of firstly selecting adjacent pixels for the pixels of the shadow texture with the first solution, extracting the pixel set corresponding to the adjacent pixels from the rasterized pixels rasterized under the second resolution, and finally extracting the pixels with the same position as each pixel block at the pixels of the shadow texture with the first resolution from the pixel set; therefore, the electronic device can complete extraction of the matched pixels so as to extract shadow pixels from the matched pixels subsequently.

In some embodiments, the first resolution includes: a plurality of first sub-resolutions, and at least one object refers to a plurality of objects; under this situation, the electronic device is capable of grouping the plurality of objects and synchronously performing distance field shadow texture processing on the objects in each object group in parallel, thus the parallelism is further improved. Therefore, after determining the corresponding second solution according to the model data of each object, namely, after S102, the method further can include:

S106: Classify the plurality of objects by utilizing the plurality of first sub-resolutions and the second resolution corresponding to model data of each object to obtain a plurality of object sets.

In some embodiments, the electronic device is capable of dividing the plurality of objects into different object sets according to the plurality of first sub-resolutions and the second resolution corresponding to the model data of each object, where the objects with the same first sub-resolution and the same second resolution belong to the same object set, so that the multiple relationship between the first sub-resolution and the second resolution corresponding to the objects in the same object set is the same. That is, in the embodiment of this application, the first sub-resolutions are firstly utilized to carry out preliminary category division on the information of the plurality of objects, and then the second resolution is utilized to carry out category division on the object set obtained by preliminary category division, thus the plurality of object sets are obtained.

In some embodiments, the number of the object sets and the number of the first sub-resolutions are not necessarily the same.

Then, the electronic device is capable of performing the following processing on the plurality of object sets in parallel:

S107: Rasterize the model data corresponding to objects in the object set based on the second resolution corresponding to the object set to obtain rasterized pixels corresponding to the model data of the objects in the object set.

S108: Determine shadow edges formed by the objects in the object set under the influence of the light source information in parallel by utilizing the rasterized pixels of the model data of the objects in the object set.

S109: Compute the distance from the rasterized pixels to the shadow edges corresponding to objects in the object set in parallel to obtain distance data corresponding to the objects in the object set.

The first sub-resolutions corresponding to the objects in each object set are the same, and the second resolutions are also the same, so the electronic device is capable of performing parallel task processing on each object set, and determining parallel distance data of the objects in each object set in parallel, thereby achieving two-layer parallelism; and therefore, the computation efficiency of distance data is improved again.

The process of determining the distance field data for the objects in each object set in the embodiment of this application can be implemented according to the steps of S103-S104.

S110: Correspondingly store the distance data corresponding to the objects in the object set to the shadow textures with the first sub-resolution corresponding to the object set to obtain the distance field shadow textures corresponding to the objects in the object set.

When completing the computation of distance data of all objects in the object sets, the electronic device is capable of correspondingly storing the obtained distance data corresponding to the objects in each object set on the shadow texture with the first sub-resolution corresponding to each object set, and obtaining the distance field shadow texture of the objects in each object set after the storage is completed.

In some embodiments, when the first resolution includes a plurality of first sub-resolutions, the electronic device utilizes a search process of performing two-layer parallel operation, namely, performing parallel operation on all the object sets and performing parallel operation on the objects in the object set to obtain the distance field shadow textures corresponding to the plurality of objects to improve the parallelism of distance field shadow texture processing.

In some embodiments, the classifying the plurality of objects by utilizing the plurality of first sub-resolutions and the second resolution corresponding to model data of each object to obtain the plurality of object sets is the implementation process of S106 and can include: S1061-S1064 as follows:

S1061: Classify the plurality of objects by utilizing the plurality of first sub-resolutions to obtain a plurality of initial sets.

The electronic device is capable of firstly performing preliminary category division on the plurality of pieces of sub-object information according to the plurality of first sub-resolutions so as to obtain numbers of initial sets corresponding to the first sub-resolutions.

In some embodiments, when the electronic device is implemented as a terminal and a server at the same time, the step can be completed at the terminal, and the server receives the information which is transmitted by the terminal and indicates the object in each initial set.

S1062: Determine the ratio of the second resolution corresponding to the object in each initial set to the first sub-resolution corresponding to each initial set as a classification coefficient of the object in each initial set.

The electronic device is capable of comparing the second resolution corresponding to each object in each initial set with the first sub-resolution corresponding to each initial set so as to compute the classification coefficient corresponding to each object in each initial set.

The electronic device is capable of treating the second resolution as the denominator and treating the first sub-resolution as the numerator for comparison to obtain the classification coefficient; the electronic device is further capable of treating the second resolution as the numerator, and treating the first sub-resolution as the denominator for comparison; meanwhile, the ratio is actually a super-sampling coefficient, that is, the classification coefficient corresponding to each piece of object information can also be the super-sampling coefficient corresponding to each piece of object information, thus the electronic device does not need to compute the super-sampling parameter again when determining the corresponding relationship between the pixels of the shadow texture with the first sub-resolution and the rasterized pixels.

S1063: Classify the objects in each initial set according to the classification coefficient to obtain a plurality of intermediate sets corresponding to each initial set.

Figure 13:
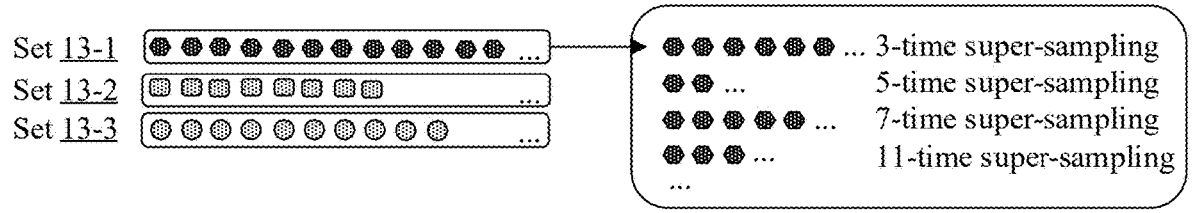
FIG. 13 is an example schematic diagram of classifying objects in initial object sets according to an embodiment of this application.

Exemplary, the embodiment of this application provides the schematic diagram of classifying the objects in the initial set, as shown in FIG. 13, there are three initial sets: a set 13-1, a set 13-2 and a set 13-3. The electronic device is capable of treating the super-sampling coefficient of each object in the set 13-1 as the classification coefficient to classify each object in the initial set. It can be seen from the FIG. 13 that each piece of object information in the initial set can be divided into 4 categories according to a 3-time super-sampling coefficient, a 5-time super-sampling coefficient, 7-time super-sampling data and an 11-time super-sampling coefficient, and each category herein is the intermediate set of the set 13-1. The electronic device is capable of obtaining an intermediate set of the set 13-2 and the set 13-3 by the same mode.

S1064: Determine a plurality of intermediate sets corresponding to each initial set as the plurality of object sets.

When determining the plurality of intermediate sets for each initial set, the electronic device is capable of integrating at least one intermediate object information set corresponding to each initial set to obtain a plurality of object information sets.

In some embodiments, the electronic device is capable of primarily classifying the plurality of objects by using the plurality of first sub-resolutions, and then classifying each object in each initial set again by using the second resolution corresponding to each object in each initial set; and therefore, the electronic device can obtain a plurality of object sets needing parallel processing.

In some embodiments, after correspondingly storing the distance data corresponding to each object to the shadow texture with the first resolution so as to obtain the distance field shadow texture corresponding to each object, namely, after S105, the method further can include: S401-S404 as follows:

S401: Render a corresponding model effect for the model data of each object.

The electronic device is capable of determining a three-dimensional shape of each object and texture information corresponding to the three-dimensional shape by utilizing model data of each object, and then performing rendering to obtain the model effect corresponding to the model data of each object.

S402: Sample from the distance field shadow texture corresponding to each object to obtain distance data corresponding to each object.

S403: Perform shadow rendering on the model data of each object by using the distance data to obtain the shadow effect corresponding to each object.

The electronic device is capable of judging whether each object is covered by the shadow or not according to the distance data, sampled from the distance field shadow texture, of each object so as to determine whether the shadow effect is generated for each object or not and the proportion, the type and the like of the shadow effect, thereby obtaining the shadow effect corresponding to each object.

S404: Display the model effect and the shadow effect.

After rendering, the electronic device is capable of synchronously displaying the model effect and the shadow effect in the display interface of the virtual scene so as to make the virtual scene more vivid.

Exemplary, FIG. 14 is the schematic diagram of the model effect and the shadow effect provided by the embodiment of this application; it can be seen from FIG. 14 that there are no sawteeth at the shadow edge, namely, the area pointed by the arrow in FIG. 14 presents a smooth line 14-1 and does not have obvious sawteeth or fine sawteeth, so that the distance field shadow texture obtained according to the method for processing the shadow texture provided by the embodiment of this application can ensure the shadow effect.

In some embodiments, the electronic device includes: a central processing unit and a graphics processing unit; the rasterizing model data of each object under the second resolution to obtain rasterized pixels of each object is the implementation process of S107 and can include: S107A as follows:

S107A: Rasterize the model data of each object under the second resolution through the central processing unit to obtain the rasterized pixels of each object.

The extracting the shadow edge formed by each object under the influence of light source information from the rasterized pixels in parallel according to the positions of the texels corresponding to the rasterized pixels and the matched sub-light source information may be the implementation process of S1032 and can include S1032A as follows:

S1032A: Extract the shadow edge formed by each object under the influence of light source information from the rasterized pixels in parallel through the graphics processing unit according to the positions of texels corresponding to the rasterized pixels and the matched sub-light source information.

The computing the distance from the rasterized pixels to the shadow edge corresponding to each object in parallel to obtain the distance data corresponding to each object of the shadow texture with the first resolution may be implementation process of S104 and can include: S104A as follows:

S104A: Compute the distance from the rasterized pixels to the shadow edge corresponding to each object in parallel to obtain the distance data corresponding to each object of the shadow texture with the first resolution through the graphics processing unit.

That is, in the embodiment of this application, the central processing unit and the graphics processing unit respectively bear a part of processing steps of distance field shadow texture processing. Meanwhile, the central processing unit transmits data to be processed to the graphics processing unit.

Therefore, after rasterizing the model data of each object under the second resolution to obtain rasterized pixels of each object through the central processing unit and before extracting the shadow edge formed by each object under the influence of light source information from the rasterized pixels in parallel through the graphics processing unit according to the positions of the texels corresponding to the rasterized pixels and the matched sub-light source information, the electronic device is capable of transmitting the rasterized pixels of each object, the second resolution corresponding to each object, the first resolution of each object and the matched sub-light source to the graphics processing unit in parallel.

In such situation, correspondingly storing the distance data corresponding to each object to the shadow texture with the first resolution so as to obtain the distance field shadow texture corresponding to each object may be the implementation process of S105 and can include: S1051-S1052 as follows:

S1051: Receive distance data of each object returned by the graphics processing unit through the central processing unit.

S1052: Code the distance data of each object through the central processing unit and correspondingly store the distance data corresponding to each object to the shadow texture with the first resolution so as to obtain the distance field shadow texture corresponding to each object.

After calculating the distance data of each object, the graphics processing unit will return the distance data to the central processing unit. And then, the electronic device will utilize the central processing unit to code the distance data corresponding to each object, and utilize the coding result to replace the original pixel value of the pixel of the shadow texture with the first resolution, and thus the electronic device obtains the distance field shadow texture.

An example embodiment in an application scene is described as follows.

The embodiment of this application is implemented during baking the shadow in the game scene to the texture in advance. The baking of the shadow texture mainly includes the following steps:

Step 1: Collect the model data (at least one piece of object information) of all objects in the game scene through the terminal, group the objects (grouping to obtain a plurality of initial sets) based on the set low resolutions (there might be a plurality of different low resolutions set, and each low-resolution is a first sub-resolution), the low resolutions in the same group being the same, and transmit the object information to the server by group (the electronic device is implemented as the terminal and the server at the same time, namely, the terminal is used for preliminary classification, and the server receives the object information in each preliminary set).

Step 2: Compute the super-sampling parameters (classification coefficients) based on the object size data and the low solution through the server after grouping, and subdivide into finer subgroups (a plurality of object sets) according to the super-sampling coefficients, or directly subdivide into finer subgroups according to the second resolution, the low resolution of each subgroup being the same, and the super-sampling coefficients being the same (objects with the same first sub-resolution and the same second resolution belong to the same object set).

Step 3: Rasterize data such as positions and normal of all objects (objects in each object set) in the subgroups according to high resolution (rasterize the model data corresponding to the objects in each object set under the second resolution corresponding to each object set), and collect the light source with influence on the object for each object at the same time.

Step 4: Transmit position data and normal data of the plurality of objects, each object being treated as one layer, organize all light sources with influence on the objects in the subgroups into an array at the same time, and transmit to the GPU for computation.

Step 5: Establish index information of the layered distance field shadow texture in each subgroup, the index information of each layer of distance field shadow texture corresponding to a combination of one object and a light source with influence on the object (matched sub-light source information is determined for the objects in each object set).

Step 6: Obtain corresponding light source data and object data for each layer of data according to the index, and determine the shadow edge.

Step 7: Compute the distance field shadow of each layer of high resolution (second resolution).

Step 8: Perform downsampling on each layer of data to obtain a distance field shadow (distance data) of each layer of low resolution. And Step 9: Process the distance field shadow on the texture with low resolution (store to the shadow texture with the first resolution).

Therefore, the abovementioned process is to perform parallel processing on all subgroups, and meanwhile, for each object in each subgroup, the distance field shadow data of each object is computed in parallel.

In some embodiments, for the distance field shadow of each object in the subgroups, the computation can be carried out according to the following process:

S501: Upload various information (including light source information of the virtual scene and model data of the at least one object) in the game scene and rendering kernel (program code of the processing process) to the GPU (the graphics processing unit in the electronic device). For each object in the game scene, each light source corresponding to the object is provided with a distance field shadow texture (the distance field shadow texture corresponding to each object). Compute the high resolution (second resolution) based on the low resolution (first resolution) set by the user and the actual size (the surface area of the object) of the object, and compute the super-sampling coefficient (super-sampling parameter). The super-sampling coefficient is computed when the subgroup is divided, and meanwhile, the following processing process can be directly carried out without continuously computing the super-sampling coefficient again.

S502: Rasterize data such as the position and the normal of the object to reach high resolution (rasterized pixels), and upload the data to the GPU.

S503: Compute the distance field shadow in the GPU by using the following two sub-steps:

S5031: Emit rays to the light source from the position (position of the texel) of each texel with high resolution, and compute whether the texel is in the shadow (shadow coverage information). And S5032: Compute the position of the shadow edge (extract the shadow edge corresponding to each object by using the shadow coverage information) based on the result of the step S5031. Compute the distance from the pixel center (the pixel center of the shadow texture with the first resolution) with low solution to the position of the shadow edge in the GPU.

Due to the fact that the search range is large, and the low resolution is small, GPU operation is not suitable; and in actual operation, firstly, each pixel is partitioned according to the super-sampling coefficient (obtaining a plurality of sub-pixel blocks), the distance (at least one shadow distance) of each sub-block is computed, and therefore computation is equally bore by each sub-block. For example, in a graph in FIG. 12, for the small grids filled with point cloud, the small grids filled with the oblique lines are processed, judge whether they are at the edge of the shadow or not, and compute the distance, and other sub-blocks search for corresponding square areas. Merging is performed on the distances of the sub-blocks, namely the shortest distance is taken and treated as the distance field shadow (distance data) with low resolution.

S504: Transmit the distance data back to the CPU from the GPU, and code and store the distance data to the shadow texture with low solution through the CPU to obtain the distance field shadow texture.

Therefore, the distance field shadow texture of each object in the subgroup is completed.

Then, the distance field shadow texture of each object of the server can be arranged in the installation package and provided for the user. When the user installs and starts the game, the game terminal will perform shadow rendering by utilizing distance field shadow texture rendering, so that a more vivid game scene is presented to the user; or the server returns the distance field shadow texture of each object to the terminal, and the terminal will render and display the virtual scene, and thus the designer can judge whether the model data of the object in the virtual scene is to be modified or not.

The shadow texture processing efficiency is measured by the processing time consumption and the synchronous starting frequency of the GPU and the CPU. As shown in FIG. 15, FIG. 15 is the code debugging diagram of a method for processing the shadow texture, it can be seen from FIG. 15 that the Stages Duration is 2,337.319 s, the Category Duration is 2,337.692 s, and the starting frequency is 14,456 times. FIG. 16 is the code debugging diagram of the method for processing the shadow texture provided by the embodiment of this application, as shown in FIG. 16, the Stages Duration is reduced to 107.972 s, the Category Duration is changed to 108.025 s, and the starting frequency is reduced to 186 times. Therefore, the method for processing the shadow texture provided by the embodiment of this application has the advantages that the speed is increased by about 20 times, and the starting frequency is reduced by about 80 times. Thus, with the adoption of the method for processing the shadow texture provided by the embodiment of this application, the computation density is improved, the data transmission batches are reduced, and the shadow texture processing efficiency is greatly improved.

The method for processing the shadow texture provided by the embodiment of this application can adapt to various game scenes. Table 1 shows the time consumption condition of the method for processing the shadow texture in different game scenes.

TABLE 1

| Game scene | Related art | This application |
| --- | --- | --- |
| Temple architecture | 60 s | 10 s |
| Melee map | 2400 s | 120 s |
| 2K*2K large terrain | 72000 s | 5000 s |

As shown in Table 1, in the temple architecture of the game scene, the processing of shadow textures needs about 60 s, the processing in this application uses 10 s; in the melee map of the game scene, the processing of the shadow textures needs 2,400 s, and the processing in this application uses 12 s; and in the game scene of 2K*2K large terrain, the processing of shadow textures uses 72,000 s, and the processing in this application uses 5,000 s. Therefore, the method for processing the shadow texture provided by this application can improve the shadow texture processing efficiency in game scenes.

The example structure of implementing the apparatus 455 for processing the shadow texture provided by the embodiment of this application as a software module is continuously described as follows, and in some embodiments, as shown in FIG. 5, the software module of the apparatus 455 for processing the shadow texture stored in the memory 450 can include:

an information acquisition module 4551 configured to acquire model data and light source information of at least one object in the virtual scene, and acquiring the shadow texture with the first resolution corresponding to each object;

a resolution determination module 4552 configured to determine the corresponding second resolution according to the model data of each object, the second resolution representing the resolution in expanding of the model data according to the surface area, and the second resolution being higher than the first resolution;

a data computation module 4553 configured to determine the shadow edge formed by each object under the influence of the light source information in parallel by utilizing rasterized pixels of the model data under the second resolution, and computing the distance from the rasterized pixels to the shadow edge corresponding to each object in parallel to obtain distance data corresponding to each object of the shadow texture with the first resolution; and a texture generation module 4554 configured to correspondingly store the distance data corresponding to each object to the shadow texture with the first resolution so as to obtain the distance field shadow texture corresponding to each object.

In some embodiments, the light source information includes: a plurality of pieces of sub-light source information; the data computation module 4553 is further configured to perform the functions of screening out corresponding matched sub-light source information for each object from the plurality of pieces of sub-light source information, the matched sub-light source information representing information of sub-light sources causing lighting influence on the object; and rasterizing model data of each object under the second resolution to obtain the rasterized pixels of the model data under the second resolution.

In some embodiments, the data computation module 4553 is further configured to perform the function of extracting the shadow edge formed by each object under the influence of light source information from the rasterized pixels in parallel according to the positions of the texels corresponding to the rasterized pixels and the matched sub-light source information, the positions of the texels being obtained by performing texture coordinate expansion on the model data of each object.

In some embodiments, the data computation module 4553 is further configured to perform the functions of emitting rays to the matched sub-light source information from the positions of the texels to perform parallel shadow coverage judgment on the rasterized pixels of each object so as to obtain shadow coverage information, the shadow coverage information representing whether the rasterized pixels are in a shadow or not; and determining the shadow edge formed by each object under the influence of the light source information by using the shadow coverage information.

In some embodiments, the data computation module 4553 is further configured to perform the functions of classifying the rasterized pixels into shadow covered pixels and shadow uncovered pixels according to the shadow coverage information, screening to obtain edge pixels with adjacent rasterized pixels as shadow uncovered pixels from the shadow covered pixels; and simultaneously splicing the edge pixels to obtain the shadow edge of each object.

In some embodiments, the data computation module 4553 is also configured to perform the functions of determining the ratio of the second resolution to the first resolution as the super-sampling parameter, the super-sampling parameter representing a pixel conversion relationship between the first resolution and the second resolution; screening out a plurality of sub-pixel blocks for the pixels of the shadow texture with the first resolution from the rasterized pixels rasterized under the second resolution according to the super-sampling coefficient; extracting the plurality of matched pixels corresponding to each sub-pixel block from the rasterized pixels according to the pixels of the shadow texture with the first resolution; screening out the shadow pixel which corresponds to each sub-pixel block and belongs to the shadow edge of each object from the plurality of matched pixels; performing parallel computation on the distance from each sub-pixel block to the shadow pixel to obtain a shadow distance corresponding to each sub-pixel block; and determining the minimum shadow distance in the shadow distances corresponding to the plurality of sub-pixel blocks as the distance data of each object of the shadow texture with the first resolution.

In some embodiments, the data computation module 4553 is further configured to perform the functions of performing parallel computation on the distance from each sub-pixel block to the shadow pixel to obtain the shadow distance corresponding to each sub-pixel block, and determining the pixel distances corresponding to the plurality of sub-pixel blocks respectively as the plurality of shadow distances when obtaining the corresponding pixel distances for the plurality of sub-pixel blocks respectively.

In some embodiments, the data computation module 4553 is further configured to perform the functions of selecting adjacent pixels for the pixels of the shadow texture with the first resolution; extracting the pixel set corresponding to the adjacent pixels from the rasterized pixels; determining the position of each sub-pixel block in the pixels with the first resolution; and processing each sub-pixel block by extracting the plurality of pixels with the same position as the sub-pixel block from the pixel set, and taking the extracted plurality of pixels as the plurality of matched pixels corresponding to each sub-pixel block.

In some embodiments, the first solution includes: a plurality of first sub-resolutions, and the at least one object refers to a plurality of objects; the apparatus 455 for processing the shadow texture further includes: an information classification module 4555;

the information classification module 4555 is configured to perform the function of classifying the plurality of objects by utilizing the plurality of first sub-resolutions and the second resolution corresponding to the model data of each object to obtain the plurality of object sets; and the data computation module 4553 is further configured to perform the functions of rasterizing the model data corresponding to the objects in the object sets based on the second resolution corresponding to the object sets to obtain rasterized pixels corresponding to the model data of the objects in the object sets; determining shadow edges formed by the objects in the object sets under the influence of the light source information in parallel by utilizing the rasterized pixels of the model data of the objects in the object sets; computing distance from the rasterized pixels to shadow edges corresponding to objects in the object sets in parallel to obtain distance data corresponding to the objects in the object sets; and correspondingly storing the distance data corresponding to the objects in the object set to the shadow textures with first sub-resolution corresponding to the object set to obtain distance field shadow textures corresponding to the objects in the object set.

In some embodiments, the information classification module 4555 is further configured to perform the functions of classifying the plurality of objects by utilizing the plurality of first sub-resolutions to obtain the plurality of initial sets; determining the ratio of the second resolution corresponding to the object in each initial set to the first sub-resolution corresponding to each initial set as the classification coefficient of the object in each initial set; classifying the object information in each initial set according to the classification coefficient to obtain the plurality of intermediate set corresponding to each initial set; and determining the plurality of intermediate sets corresponding to each initial set as the plurality of object sets.

In some embodiments, the apparatus 455 for processing the shadow texture further includes: a scene rendering module 4556 and an information displaying module 4557;

the scene rendering module 4556 is configured to perform the functions of rendering a corresponding model effect for the model data of each object; sampling from the distance field shadow texture corresponding to each object to obtain distance data corresponding to each object; performing shadow rendering on the model data of each object by using the distance data to obtain a shadow effect corresponding to each object; and the information displaying module 4557 is configured to perform the function of displaying the model effect and the shadow effect.

In some embodiments, the electronic device includes: a central processing unit and a graphics processing unit; the data computation module 4553 is further configured to perform the functions of rasterizing the model data of each object under the second resolution through the central processing unit to obtain the rasterized pixels of each object; extracting the shadow edge formed by each object under the influence of light source information from the rasterized pixels in parallel according to the positions of the texels corresponding to the rasterized pixels and the matched sub-light source information through the graphics processing unit; and computing the distance from the rasterized pixels to the shadow edge corresponding to each object in parallel to obtain distance data corresponding to each object of the shadow texture with the first resolution through the graphics processing unit.

In some embodiments, the data computation module 4553 is also configured to perform the function of transmitting the rasterized pixels of each object, the second resolution corresponding to each object, the first resolution of each object and the matched sub-light source information to the graphics processing unit through the central processing unit.

In some embodiments, the texture generation module 4554 is configured to perform the functions of receiving the distance data of each object returned from the graphics processing unit through the central processing unit; and coding the distance data of each object through the central processing unit, and correspondingly storing a coding result into the pixels of the shadow texture with the first resolution to obtain the distance field shadow texture corresponding to each object.

The embodiment of this application provides a computer program product or a computer program. The computer program product or the computer program includes computer instructions, and the computer instructions are stored in a non-transitory computer-readable storage medium. A processor of a computer device reads the computer instructions from the non-transitory computer-readable storage medium, and executes the computer instructions, causing the computer device to perform the method for processing the shadow texture according to the embodiment of this application.

The embodiment of this application provides a non-transitory computer-readable storage medium storing executable instructions. When the executable instructions are executed by a processor, the processor is caused to perform the method for processing the shadow texture according to the embodiment of this application, such as the method shown in FIG. 6.

In some embodiments, the non-transitory computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions may be written in any form of programming language (including a compiled or interpreted language, or a declarative or procedural language) by using the form of a program, software, a software module, a script or a code, and may be deployed in any form, including being deployed as an independent program or being deployed as a module, a component, a subroutine, or another unit suitable for use in a computing environment.

In an example, the executable instructions may be deployed to be executed on a computing device (electronic device), or deployed to be executed on a plurality of computing devices at the same location, or deployed to be executed on a plurality of computing devices that are distributed in a plurality of locations and interconnected by using a communication network.

The foregoing descriptions are merely embodiments of this application and are not intended to limit the protection scope of this application. Any modification, equivalent replacement, and improvement made without departing from the spirit and scope of this application shall fall within the protection scope of this application.

What is claimed is:

1. A method for processing a shadow texture comprising:
   acquiring model data and light source information of at least one object in a virtual scene;
   acquiring a shadow texture with a first resolution corresponding to each of the at least one object;
   determining a corresponding second resolution based on the model data of each of the at least one object, the second resolution representing a resolution of expanding the model data based on a surface area, the second resolution being higher than the first resolution;
   determining a shadow edge formed by each of the at least one object under an influence of the light source information in parallel by utilizing rasterized pixels of the model data under the second resolution;
   computing a distance from the rasterized pixels to the shadow edge corresponding to each of the at least one object in parallel to obtain a distance data corresponding to each of the at least one object of the shadow texture with the first resolution; and
   storing the distance data to the shadow texture with the first resolution to obtain a distance field shadow texture corresponding to each of the at least one object.

2. The method according to claim 1, the light source information comprising a plurality of pieces of sub-light source information, and the method further comprising:
   screening out corresponding matched sub-light source information for each of the at least one object from the plurality of pieces of sub-light source information, the matched sub-light source information representing information of sub-light sources causing lighting influence on the at least one object; and
   rasterizing the model data of each of the at least one object under the second resolution to obtain the rasterized pixels of the model data under the second resolution.

3. The method according to claim 2, the determining the shadow edge further comprising:
   extracting the shadow edge formed by each of the at least one object under the influence of light source information from the rasterized pixels in parallel based on positions of texels corresponding to the rasterized pixels and the matched sub-light source information, the positions of the texels obtained by performing texture coordinate expansion on the model data of each of the at least one object.

4. The method according to claim 3, the extracting the shadow edge further comprising:
   emitting rays to the matched sub-light source information from the positions of the texels to perform parallel shadow coverage judgment on the rasterized pixels of each of the at least one object to obtain a shadow coverage information, the shadow coverage information representing whether the rasterized pixels are within a shadow; and
   determining the shadow edge formed by each of the at least one object under the influence of the light source information using the shadow coverage information.

5. The method according to claim 4, the determining the shadow edge using the shadow coverage information further comprising:
   classifying the rasterized pixels into shadow covered pixels and shadow uncovered pixels based on the shadow coverage information;
   screening to obtain edge pixels with adjacent rasterized pixels differentiating the shadow uncovered pixels and the shadow covered pixels; and
   simultaneously splicing the edge pixels to obtain the shadow edge of each of the at least one object.

6. The method according to claim 4, performed by an electronic device, the electronic device comprising a central processing unit and a graphics processing unit;
   wherein the rasterizing the model data further comprising:
      rasterizing the model data under the second resolution using the central processing unit to obtain the rasterized pixels of each of the least one object;
   the extracting the shadow edge further comprising:
      extracting the shadow edge formed by each of the at least one object under the influence of light source information from the rasterized pixels in parallel based on the positions of the texels corresponding to the rasterized pixels and the matched sub-light source information using the graphics processing unit; and
   the computing the distance from the rasterized pixels to the shadow edge further comprising:
      computing the distance from the rasterized pixels to the shadow edge corresponding to each of the at least one object in parallel to obtain the distance data corresponding to each of the at least one object of the shadow texture with the first resolution using the graphics processing unit.

7. The method according to claim 6, further comprising:
   transmitting the rasterized pixels of each of the at least one object, the second resolution corresponding to each of the at least one object, the first resolution of each of the at least one object and the matched sub-light source information to the graphics processing unit using the central processing unit.

8. The method according to claim 6, the storing the distance data further comprising:
   receiving the distance data of each of the at least one object from the graphics processing unit; and
   coding the distance data of each of the at least one object using the central processing unit, and storing a corresponding coding result into pixels of the shadow texture with the first resolution to obtain the distance field shadow texture corresponding to each of the at least one object.

9. The method according to claim 1, the computing the distance from the rasterized pixels to the shadow edge further comprising:
   defining a super-sampling parameter as a ratio of the second resolution to the first resolution, the super-sampling parameter representing a pixel conversion relationship between the first resolution and the second resolution;
   screening out a plurality of sub-pixel blocks for pixels of the shadow texture with the first resolution from the rasterized pixels rasterized under the second resolution based on the super-sampling parameter;

extracting a plurality of matched pixels corresponding to each of the plurality of sub-pixel blocks from the rasterized pixels based on the pixels of the shadow texture with the first resolution;

screening out a shadow pixel which corresponds to each of the plurality of sub-pixel blocks and belongs to the shadow edge of each of the at least one object from the plurality of matched pixels;

computing in parallel a shadow distance corresponding to each of the plurality of sub-pixel blocks based on a distance from each of the plurality of sub-pixel blocks to the shadow pixel; and determining a minimum shadow distance corresponding to the plurality of sub-pixel blocks as the distance data of each of the at least one object of the shadow texture with the first resolution.

10. The method according to claim 9, the computing in parallel the shadow distance further comprising:

computing in parallel the distance from each of the plurality of sub-pixel blocks to the shadow pixel to obtain the shadow distance corresponding to each of the plurality of sub-pixel blocks; and determining a pixel distance corresponding to each of the plurality of sub-pixel blocks respectively as the shadow distance when obtaining the pixel distance for each of the plurality of sub-pixel blocks respectively.

11. The method according to claim 10, the extracting the plurality of matched pixels further comprising:

selecting adjacent pixels for the pixels of the shadow texture with the first resolution;

extracting a pixel set corresponding to the adjacent pixels from the rasterized pixels;

determining a position of each of the plurality of sub-pixel blocks in the pixels of the shadow texture with the first resolution; and processing each of the plurality sub-pixel blocks by extracting a plurality of pixels with a same position as the sub-pixel block from the pixel set, and using the extracted plurality of pixels as the plurality of matched pixels corresponding to each of the plurality of sub-pixel blocks.

12. The method according to claim 1, wherein the at least one object is a plurality of objects, the first resolution comprising a plurality of sub-resolutions, and the method further comprising:

classifying the plurality of objects by utilizing the plurality of sub-resolutions and the second resolution corresponding to the model data of each of the plurality of objects to obtain a plurality of object sets, the plurality of objects with a same sub-resolution and a same second resolution belonging to a same object set;

processing the plurality of object sets in parallel by:
rasterizing the model data corresponding to the plurality of objects based on the second resolution corresponding to the plurality of object sets to obtain rasterized pixels corresponding to the model data;

determining shadow edges formed by the plurality of objects under the influence of the light source information in parallel by utilizing the rasterized pixels of the model data;

computing a distance from the rasterized pixels to shadow edges corresponding to the plurality of objects in parallel to obtain the distance data corresponding to the plurality of objects; and respectively storing the distance data corresponding to the plurality of objects with the plurality of sub-resolutions corresponding to the plurality of object sets to obtain the distance field shadow texture corresponding to the plurality of objects.

13. The method according to claim 12, the classifying the plurality of objects further comprising:

classifying the plurality of objects by utilizing the plurality of sub-resolutions to obtain a plurality of initial sets;

defining a classification coefficient of the plurality of objects in each of the plurality of initials sets as a ratio of the second resolution corresponding to the plurality of objects in each of the plurality of initials sets to the plurality of sub-resolution corresponding to each of the plurality of initials sets;

classifying the plurality of objects in each of the plurality of initial sets based on the classification coefficient to obtain a plurality of intermediate sets corresponding to each of the plurality of initial sets; and defining the plurality of object sets as the plurality of intermediate sets corresponding to each of the plurality of initial sets.

14. The method according claim 1, the method further comprising:

rendering a corresponding model effect for the model data of each of the at least one object;

sampling from the distance field shadow texture to obtain the distance data corresponding to each of the at least one object;

performing shadow rendering on the model data using the distance data to obtain a shadow effect corresponding to each of the at least one object; and displaying the model effect and the shadow effect.

15. An apparatus for processing a shadow texture comprising at least one processor and at least one memory, the at least one memory storing computer-readable instructions, the computer-readable instructions, when executed by the at least on processor, causing the at least one processor to:

acquire model data and light source information of at least one object in a virtual scene;

acquire a shadow texture with a first resolution corresponding to each of the at least one object;

determine a corresponding second resolution based on the model data of each of the at least one object, the second resolution representing a resolution of expanding the model data based on a surface area, the second resolution being higher than the first resolution;

determine a shadow edge formed by each of the at least one object under an influence of the light source information in parallel by utilizing rasterized pixels of the model data under the second resolution;

computing a distance from the rasterized pixels to the shadow edge corresponding to each of the at least one object in parallel to obtain a distance data corresponding to each of the at least one object of the shadow texture with the first resolution; and store the distance data to the shadow texture with the first resolution to obtain a distance field shadow texture corresponding to each of the at least one object.

16. A non-transitory computer-readable storage medium, storing at least one instruction, at least one program, a code set, or an instruction set, the at least one instruction, the at least one program, the code set, or the instruction set being loaded and executed by at least one processor, causing the at least one processor to perform a method for processing a shadow texture comprising:

acquiring model data and light source information of at least one object in a virtual scene;

acquiring a shadow texture with a first resolution corresponding to each of the at least one object;

determining a corresponding second resolution based on the model data of each of the at least one object, the second resolution representing a resolution of expanding the model data based on a surface area, the second resolution being higher than the first resolution;

determining a shadow edge formed by each of the at least one object under an influence of the light source information in parallel by utilizing rasterized pixels of the model data under the second resolution;

computing a distance from the rasterized pixels to the shadow edge corresponding to each of the at least one object in parallel to obtain a distance data corresponding to each of the at least one object of the shadow texture with the first resolution; and storing the distance data to the shadow texture with the first resolution to obtain a distance field shadow texture corresponding to each of the at least one object.

17. The non-transitory computer-readable storage medium of claim 16, the method further comprising:

the light source information comprising a plurality of pieces of sub-light source information, and the method further comprising:

screening out corresponding matched sub-light source information for each of the at least one object from the plurality of pieces of sub-light source information, the matched sub-light source information representing information of sub-light sources causing lighting influence on the at least one object; and rasterizing the model data of each of the at least one object under the second resolution to obtain the rasterized pixels of the model data under the second resolution.

18. The non-transitory computer-readable storage medium of claim 17, the determining the shadow edge further comprising:

extracting the shadow edge formed by each of the at least one object under the influence of light source information from the rasterized pixels in parallel based on positions of texels corresponding to the rasterized pixels and the matched sub-light source information, the positions of the texels obtained by performing texture coordinate expansion on the model data of each of the at least one object.

19. The non-transitory computer-readable storage medium of claim 16, wherein the at least one object is a plurality of objects, the first resolution comprising a plurality of sub-resolutions, and the method further comprising:

rendering a corresponding model effect for the model data of each of the at least one object;

sampling from the distance field shadow texture to obtain the distance data corresponding to each of the at least one object;

performing shadow rendering on the model data using the distance data to obtain a shadow effect corresponding to each of the at least one object; and displaying the model effect and the shadow effect.

20. The non-transitory computer-readable storage medium of claim 16, wherein the at least one object is a plurality of objects, the first resolution comprising a plurality of sub-resolutions, and the method further comprising:

classifying the plurality of objects by utilizing the plurality of sub-resolutions and the second resolution corresponding to the model data of each of the plurality of objects to obtain a plurality of object sets, the plurality of objects with a same sub-resolution and a same second resolution belonging to a same object set; processing the plurality of object sets in parallel by: rasterizing the model data corresponding to the plurality of objects based on the second resolution corresponding to the plurality of object sets to obtain rasterized pixels corresponding to the model data; determining shadow edges formed by the plurality of objects under the influence of the light source information in parallel by utilizing the rasterized pixels of the model data; computing a distance from the rasterized pixels to shadow edges corresponding to the plurality of objects in parallel to obtain the distance data corresponding to the plurality of objects; and respectively storing the distance data corresponding to the plurality of objects with the plurality of sub-resolutions corresponding to the plurality of object sets to obtain the distance field shadow texture corresponding to the plurality of objects.

* * * * *